United States Patent
Eguchi et al.

(10) Patent No.: US 6,945,906 B2
(45) Date of Patent: Sep. 20, 2005

(54) CONTROL SYSTEM FOR VEHICLE

(75) Inventors: Takahiro Eguchi, Saitama-ken (JP); Hirohiko Totsuka, Saitama-ken (JP); Eiji Suzuki, Saitama-ken (JP); Satoru Miyata, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 67 days.

(21) Appl. No.: 10/760,539

(22) Filed: Jan. 21, 2004

(65) Prior Publication Data

US 2004/0209732 A1 Oct. 21, 2004

(30) Foreign Application Priority Data

Jan. 29, 2003 (JP) ........................................ 2003-021225
Jan. 29, 2003 (JP) ........................................ 2003-021226

(51) Int. Cl.[7] ...................... B60K 41/02; B60K 41/12; G06F 17/00; G06F 19/00; G06F 7/00
(52) U.S. Cl. ............................. 477/45; 477/50; 477/70; 477/176; 477/181; 701/51; 701/65; 701/67
(58) Field of Search ................................ 477/44–46, 50, 477/70, 97, 176, 181; 701/51, 53, 54, 65, 67, 68

(56) References Cited

U.S. PATENT DOCUMENTS

| | | | | |
|---|---|---|---|---|
| 4,598,611 A | * | 7/1986 | Frank | 477/39 |
| 4,793,454 A | * | 12/1988 | Petzold et al. | 477/39 |
| 5,176,234 A | * | 1/1993 | Reik et al. | 192/53.2 |
| 6,502,027 B2 | * | 12/2002 | Saotome et al. | 701/67 |
| 6,702,715 B2 | * | 3/2004 | Eguchi et al. | 477/158 |

* cited by examiner

Primary Examiner—Tisha Lewis
(74) Attorney, Agent, or Firm—Arent Fox PLLC

(57) ABSTRACT

There is provided a control system for a vehicle, which is capable of increasing the service life of a transmission belt while preventing slippage thereof, and at the same time improving fuel economy and drivability. The control system for a vehicle sets a transmission transfer torque to be transmitted from a drive pulley of a continuously variable transmission to a driven pulley of the same, and a clutch transfer torque to be transferred by a clutch. When it is determined that the vehicle is traveling on a bad road, the clutch transfer torque is reduced, and the transmission transfer torque is set to a larger value as the clutch transfer torque is larger.

4 Claims, 13 Drawing Sheets

F I G. 4A
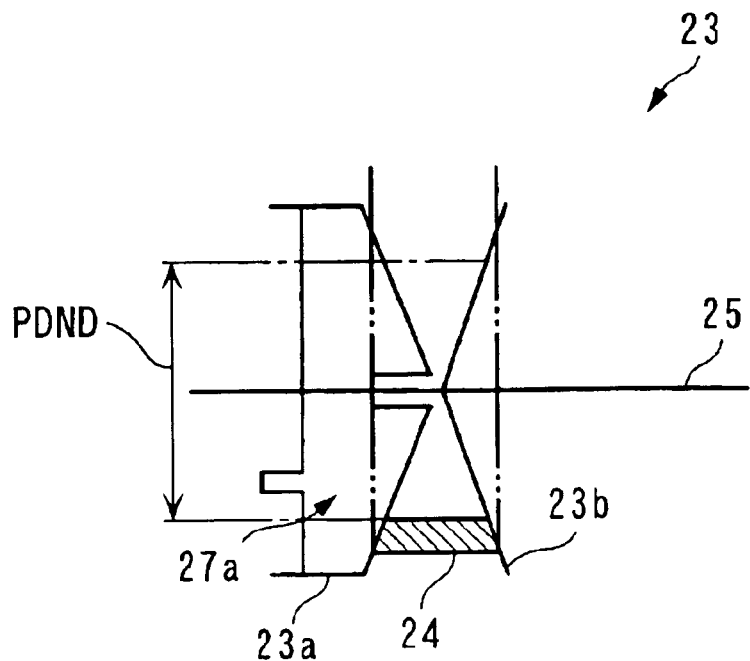
F I G. 4B
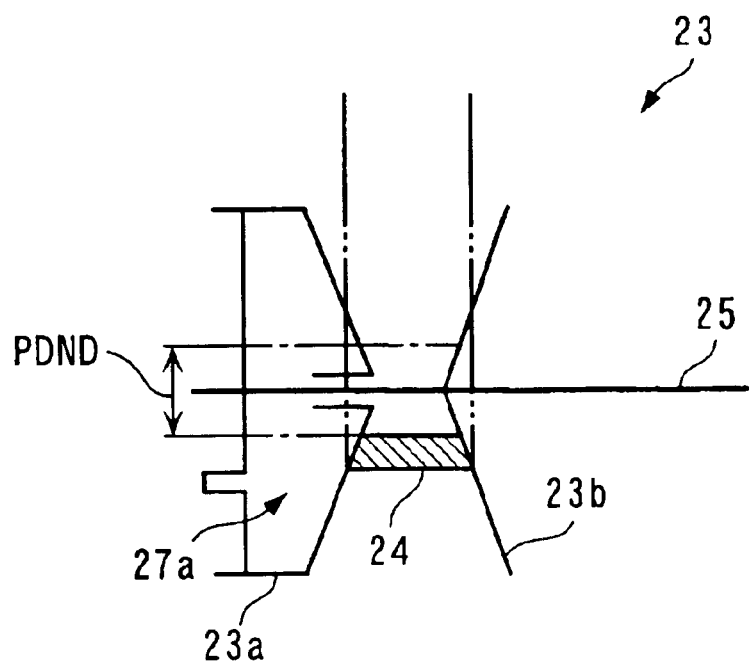

CONTROL SYSTEM FOR VEHICLE

BACKGROUND OF THE INVENTION

1. Field of the Invention

This invention relates to a control system for vehicle having a continuously variable transmission.

2. Description of the Related Art

Conventionally, a control system of the above-mentioned kind has been proposed e.g. in Japanese Laid-Open Patent Publication (Kokai) No. H4-285361 and Japanese Laid-Open Patent Publication (Kokai) No. H9-112674. The continuously variable transmission is comprised of a drive pulley connected to an engine, a driven pulley connected to drive wheels, a transmission belt for transferring a driving force between the two pulleys, and oil pressure control valves. The drive pulley has a moving part and a fixed part. The moving part is fitted on a pulley shaft such that the moving part is axially movable along the shaft but inhibited from rotation thereabout. The fixed part is fixed to the pulley shaft and opposed to the moving part. The moving part, the fixed part, and the pulley shaft define a V-shaped groove. The driven pulley has the same construction as that of the driven pulley. The transmission belt is stretched around the drive pulley and the driven pulley such that it extends in the grooves thereof. Connected to the moving parts of the drive pulley and the driven pulley via the oil pressure control valves is an oil pressure pump using the engine as a drive source. The oil pressure control valve is controlled depending on the operating conditions of the engine, whereby the oil pressure supplied to at least one of the drive pulley and the driven pulley from the oil pressure pump is controlled. This causes the moving parts to move to change the respective effective diameters of the grooves, whereby the transmission ratio is continuously controlled and at the same time the transmission belt is sandwiched between the moving part and the fixed part of each pulley, for prevention of slippage.

The control system disclosed in Japanese Laid-Open Patent Publication (Kokai) No. H4-285361 is configured such that when the vehicle is traveling on a bad road, the sandwiching force applied to the transmission belt is increased. This is with a view to the following purpose: Assuming that the vehicle is traveling on a bad road with a very rough road surface, the drive wheels rotate without load when they move over a bump, resulting in a sudden increase in the rotational speed of the engine, and then, the drive wheels land on the road surface to receive a very large resistance to the rotation of the drive wheels, developing inertia torque. The inertia torque makes the drive pulley and the driven pulley unbalanced in rotation, imposing increased load on the transmission belt, so that there is a fear of slippage of the transmission belt. The sandwiching force is increased for prevention of the slippage.

However, in this conventional control system, when the vehicle is traveling on a bad road, the sandwiching force of the transmission belt is increased with load being placed on the transmission belt, which further increases the load on the transmission belt, resulting in reduced service life thereof. Further, when the vehicle is traveling on a bad road, the inertia torque generated upon landing of the drive wheels on the road surface is transmitted to the internal combustion engine of the vehicle, causing a change in the rotational speed thereof, which degrades drivability. Further, to increase the sandwiching force applied to the transmission belt, it is necessary to increase the output of the oil pressure pump, which increases load on the engine to lower fuel economy. Further, on a bad road, the vehicle lurches violently, so that the accelerator pedal is frequently stepped-on and released at a very short time period in spite of the driver's intention. As a consequence, in the case where the degree of opening of the throttle valve is controlled according to the stepped-on amount on the accelerator pedal and the transmission ratio of the continuously variable transmission is controlled according to the degree of opening of the throttle valve, when the vehicle is traveling on a bad road, due to the control of the degree of opening of the throttle valve responsive to the stepped-on operation of the accelerator pedal, the degree of opening of the throttle valve is fluctuated, causing fluctuation of the transmission ratio controlled according thereto. As a result, the rotational speed of the engine fluctuates, also causing degraded drivability.

Further, in the control system disclosed in Japanese Laid-Open Patent Publication (Kokai) No. H9-112674, assuming that the transmission ratio of the continuously variable transmission is decreasing, the sandwiching force applied to the transmission belt is increased if a target inertia torque calculated e.g. based on the ratio between the rotational speed of the engine and that of the driven pulley is large, and at the same time, the vehicle speed is low. Under such a condition, the torque of the driven pulley largely increases, placing increased load on the transmission belt, so that there is a fear of slippage of the transmission belt. The sandwiching force is increased for prevention of the slippage.

However, according to this conventional control system, since the sandwiching force applied to the transmission belt is increased in a state where the large load is placed on the transmission belt, further increased load is placed on the transmission belt, which reduces the service life thereof. To increase the sandwiching force applied to the transmission belt, it is required to increase the output of the oil pressure pump. Further, since the target inertial torque is calculated e.g. based on the ratio of the rotational speed of the engine and that of the driven pulley, and the transmission belt is sandwiched by the control of oil pressure executed according to the result of the calculation, there is an inevitable delay in the control. To cope with this inconvenience, it is necessary to constantly set the pressure of the oil pressure pump to a little too high a level, which degrades fuel economy of the engine that drives the oil pressure pump, and further reduces the service life of the transmission belt. To solve this problem, it is contemplated to employ a continuously variable transmission having a large torque transfer capacity. However, this brings about increases in the size and manufacturing costs of the transmission. Further, it is also a conventionally known method to allow slippage of the clutch to suppress a jerky feeling occurring when the accelerator pedal is suddenly stepped on or released. However, in this case, to cope with inertia torque caused by lowered rotational speed of the engine when the clutch is engaged again after slippage thereof, it is also required to set the pressure created by the oil pressure pump to a little too high a level. This brings about the same problem described above.

SUMMARY OF THE INVENTION

It is an object of the invention to provide a control system for a vehicle, which is capable of increasing the service life of a transmission belt while preventing slippage thereof, and at the same time improving fuel economy and drivability.

To attain the above object, in a first aspect of the present invention, there is provided a control system for a vehicle having a continuously variable transmission that includes a drive pulley connected to an internal combustion engine installed on the vehicle and having a variable effective diameter, a driven pulley connected to drive wheels of the vehicle and having a variable effective diameter, and a transmission belt stretched around the drive pulley and the driven pulley, and transfers power of the engine to the drive wheels while continuously variably changing a transmission ratio by changing at least one of the respective effective diameters of the drive pulley and the driven pulley, and a clutch of a friction type which is provided between the engine and the drive wheels, the control system comprising:

transmission transfer torque-setting means for setting a transmission transfer torque to be transferred from the drive pulley to the driven pulley;

clutch transfer torque-setting means for setting a clutch transfer torque to be transferred by the clutch;

control means for controlling an engaging force of the clutch based on the clutch transfer torque set by the clutch transfer torque-setting means; and bad road-determining means for determining whether or not the vehicle is traveling on a bad road, wherein the clutch transfer torque-setting means reduces the clutch transfer torque such that slippage of the clutch is allowed, when it is determined by the bad road-determining means that the vehicle is traveling on a bad road, and wherein the transmission transfer torque-setting means sets the transmission transfer torque to a larger value as the clutch transfer torque is larger, when it is determined that the vehicle is traveling on a bad road.

With the arrangement of the control system according to the first aspect of the present invention, the clutch transfer torque to be transferred by the clutch is set by the clutch transfer torque-setting means, and the engaging force of the clutch is controlled by the control means. Also, the transmission transfer torque to be transferred from the drive pulley to the driven pulley is set by the transmission transfer torque-setting means. Further, when it is determined that the vehicle is traveling on a bad road, the clutch transfer torque (set value) is reduced such that slippage of the clutch is allowed, whereby the clutch is controlled such that it slips. With this configuration, inertia torque generated on the drive wheels when they land on the road surface while traveling on a bad road can be relieved via the clutch, thereby suppressing the degree of transfer of the inertia torque to the engine, which makes it possible to suppress fluctuation in the rotational speed of the engine and hence improve drivability. Further, since the inertia torque can be relieved via the clutch, it is possible to prevent the transmission belt from slipping and reduce load thereon, thereby increasing the service life thereof. Further, when it is determined that the vehicle is traveling on a bad road, the transmission transfer torque is set to a larger value as the clutch transfer torque is larger. This enables the transmission transfer torque to be set according to the clutch transfer torque which is reduced by slippage of the clutch without excess or shortage. Therefore, since the transmission transfer torque can be reduced, load on the continuously variable transmission can be reduced, which makes it possible to reduce the driving energy for holding the continuously variable transmission at a predetermined transmission ratio, and improve fuel economy in the case of an internal combustion engine being directly or indirectly used as the drive source.

Preferably, the vehicle includes an accelerator pedal, the engine including a throttle valve controlled according to a degree of opening of the accelerator pedal, and the control system further comprises throttle valve opening-detecting means for detecting the degree of opening of the throttle valve, target transmission ratio-setting means for setting a target transmission ratio of the continuously variable transmission according to the detected degree of opening of the throttle valve, transmission ratio control means for controlling a transmission ratio of the continuously variable transmission such that the transmission ratio becomes equal to the set target transmission ratio, and throttle valve opening-correcting means for correcting the degree of opening of the throttle valve when it is determined that the vehicle is traveling on a bad road.

With the arrangement of this preferred embodiment, according to the degree of opening of a throttle valve which is set according to the degree of opening of an accelerator pedal, a target transmission ratio is set, and the transmission ratio of the continuously variable transmission is controlled to the target transmission ratio. Further, when it is determined that the vehicle is traveling on a bad road, the degree of opening of the throttle valve is corrected. Therefore, even when the opening of the throttle valve is fluctuated through small degrees according to the driver's unintentional and repeated stepping-on and releasing operations of the accelerator pedal, it is possible to prevent fluctuation of the target transmission ratio set according to the degree of opening of the throttle valve, since the degree of opening of the throttle valve is corrected. As a consequence, it is possible to stabilize the transmission ratio of the continuously variable transmission and the rotational speed of the engine.

To attain the above object, in a second aspect of the present invention, there is provided a control system for a vehicle having a continuously variable transmission that includes a drive pulley connected to an internal combustion engine installed on the vehicle and having a variable effective diameter, a driven pulley connected to drive wheels of the vehicle and having a variable effective diameter, and a transmission belt stretched around the drive pulley and the driven pulley, and transfers power of the engine to the drive wheels while continuously variably changing a transmission ratio by changing at least one of the respective effective diameters of the drive pulley and the driven pulley, an oil pressure pump for supplying working oil pressure to the drive pulley and the driven pulley for changing the respective effective diameters thereof, and a clutch of a friction type which is provided between the engine and the drive wheels, the control system comprising:

working oil pressure-setting means for setting the working oil pressure;

clutch transfer torque-setting means for setting a clutch transfer torque to be transferred by the clutch;

control means for controlling an engaging force of the clutch based on the clutch transfer torque set by the clutch transfer torque-setting means; and output torque change amount-detecting means for detecting an amount of change in an output torque from the engine, wherein the clutch transfer torque-setting means reduces the clutch transfer torque such that slippage of the clutch is allowed, when the amount of change in the output torque detected by the output torque change amount-detecting means is larger than a predetermined value, and wherein the working oil pressure-setting means sets the working oil pressure to a higher value as the clutch transfer torque is larger, when the amount of change in the output torque is larger than the predetermined value.

With the arrangement of the control system according to the second aspect of the present invention, the working oil pressure of the oil pressure pump for actuating the drive pulley and the driven pulley is set by the working oil pressure-setting means. Also, the clutch transfer torque to be transferred by the clutch is set by the clutch transfer torque-setting means, and based on the set clutch transfer torque, the engaging force of the clutch is controlled by the control means. Further, when the amount of change in the output torque of the engine is larger than a predetermined value, the clutch transfer torque (set value) is reduced such that slippage of the clutch is allowed, whereby the clutch is controlled such that it slips. Thus, when the output torque is suddenly changed, the clutch is allowed to slip, whereby the output torque of the engine is released at the clutch. This makes it no longer necessary to transfer the suddenly changed output torque directly via the continuously variable transmission, whereby the slippage of the transmission belt can be prevented, and at the same time load on the transmission belt can be reduced. Therefore, differently from the prior art, it is no longer necessary to increase the working oil pressure. As a result, the service life of the transmission belt can be increased, and in the case of an internal combustion engine being directly and indirectly used as the drive source, it is possible to improve fuel economy. Further, due to the control of slippage of the clutch, the jerky feeling that has conventionally occurred when the accelerator pedal is suddenly stepped on or released no longer occurs, which makes it possible to maintain drivability.

Further, when the amount of change in the output torque of the engine is larger than a predetermined value, that is, when the clutch is allowed to slip, the working oil pressure is set to a larger value as the clutch transfer torque is larger. This makes it possible to set the working oil pressure to a decreased value according to the decreased clutch transfer torque, without excess or shortage, whereby fuel economy can be further improved.

Preferably, the control system further comprises clutch slippage degree-detecting means for detecting a degree of slippage of the clutch, and the clutch transfer torque-setting means reduces the clutch transfer torque, and thereafter progressively increases the clutch transfer torque depending on the detected degree of slippage of the clutch.

With the arrangement of this preferred embodiment, after the clutch transfer torque is reduced by allowing the clutch to slip, the clutch transfer torque is progressively increased according to the detected degree of slippage of the clutch. Therefore, the clutch transfer torque can be set to a small value initially when the degree of slippage of the clutch is large, and can be progressively increased as the degree of slippage of the clutch becomes smaller, which enables the clutch to be smoothly engaged. This makes it possible to prevent generation of inertia torque which could be caused by sudden engagement of the clutch, and makes it unnecessary to increase the working oil pressure to a high value to cope with the problem of inertia torque.

The above and other objects, features, and advantages of the invention will become more apparent from the following detailed description taken in conjunction with the accompanying drawings.

BRIEF DESCRIPTION OF THE DRAWINGS

FIGS. 4A and 4B show respective examples of operations of a driven pulley;

DETAILED DESCRIPTION OF PREFERRED EMBODIMENTS

Figure 1:
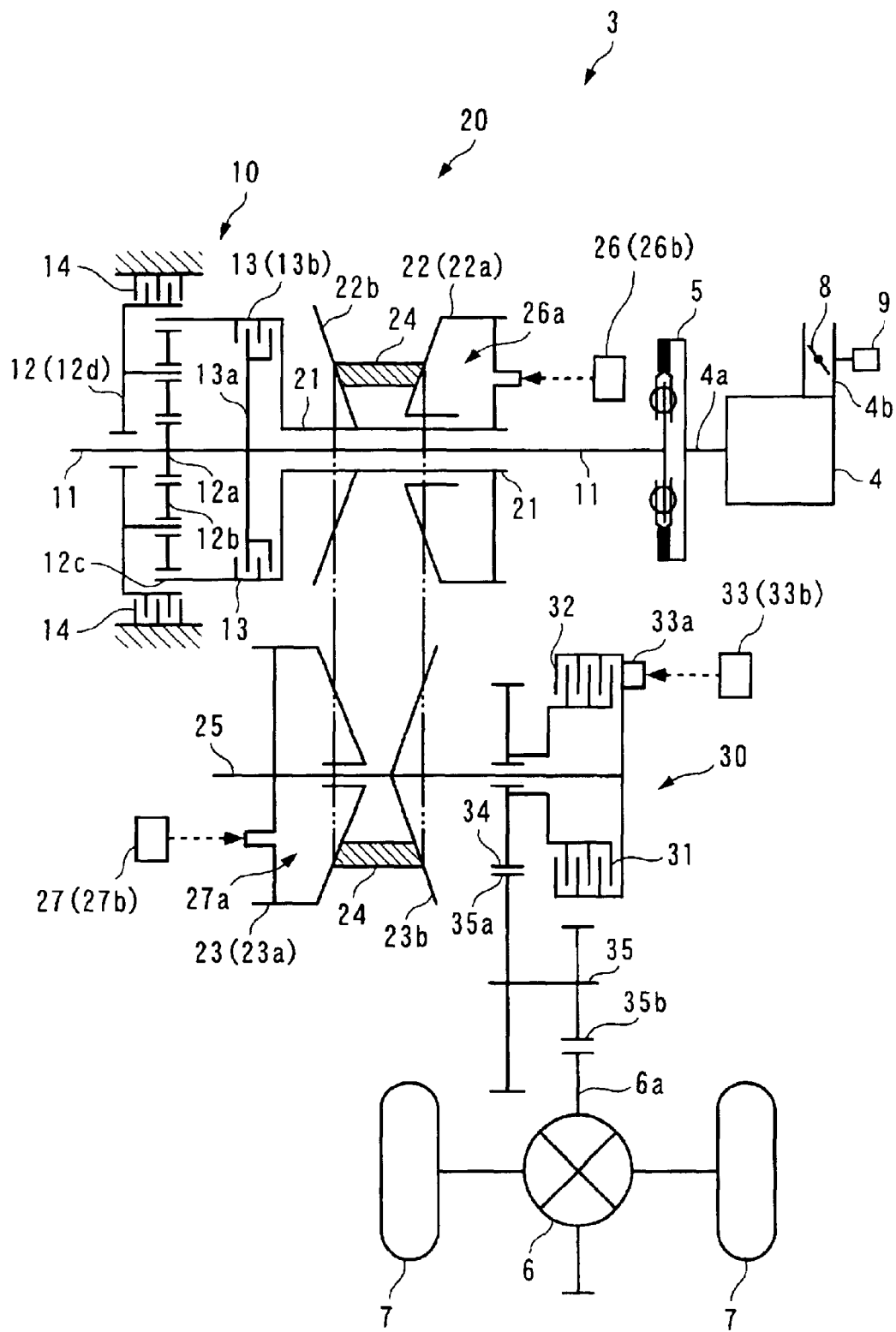
FIG. 1 is a skeleton diagram schematically showing the arrangement of a vehicle driving system.
Figure 2:
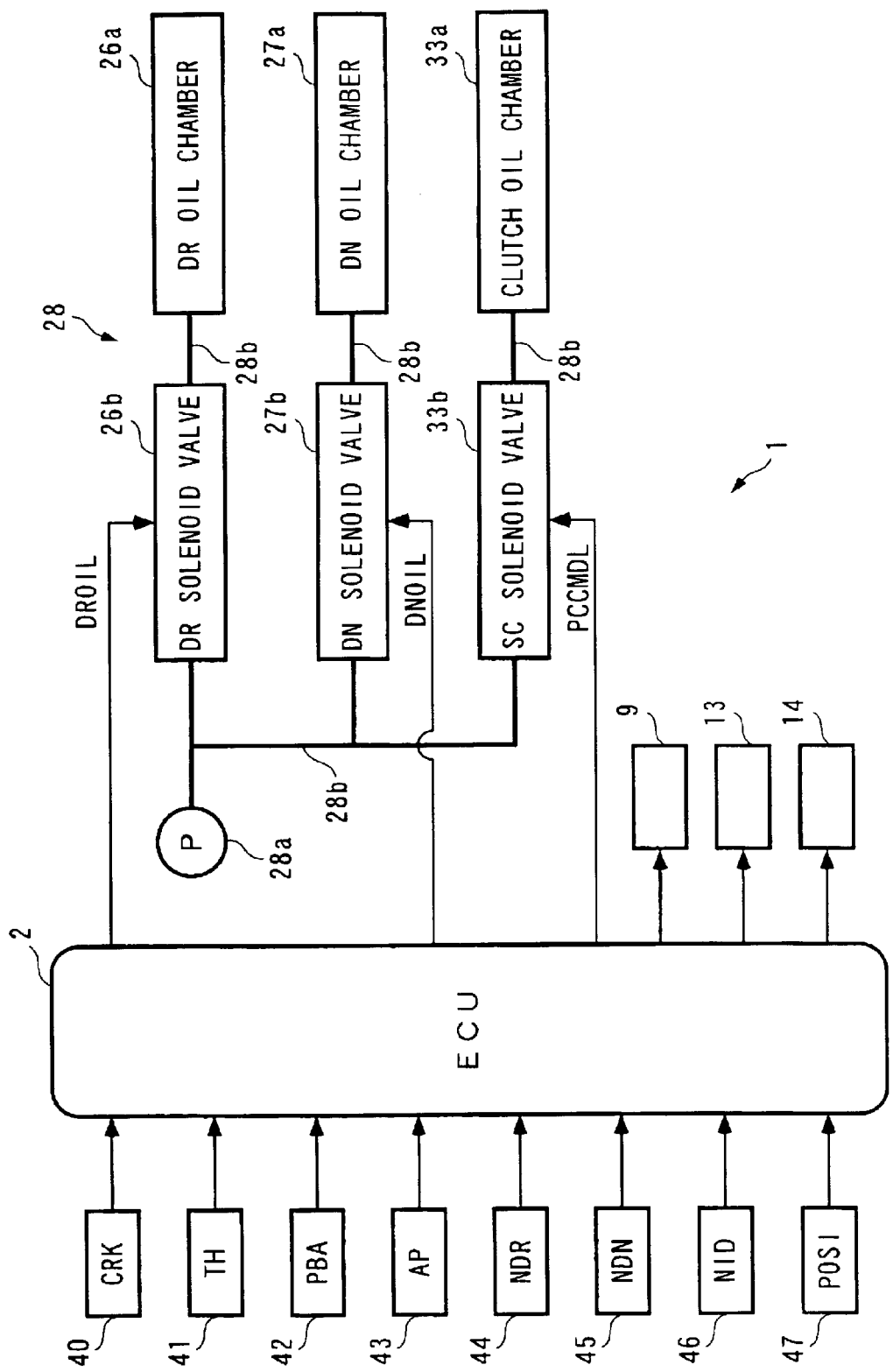
FIG. 2 is a block diagram schematically showing the arrangement of a control system according to a first embodiment of the invention and a hydraulic circuit of the vehicle driving system.

The invention will now be described in detail with reference to the drawings showing preferred embodiments thereof. Referring first to FIG. 1, there is schematically shown the arrangement of a vehicle driving system of a vehicle 3 to which is applied a control system 1 according to a first embodiment of the present invention, and FIG. 2 schematically shows the arrangement of the control system 1 and a hydraulic circuit 28 of the driving system.

As shown in FIG. 1, in the diving system of the vehicle 3, an engine (internal combustion engine) 4 as a power source is connected to drive wheels 7 and 7 via a forward/backward travel-switching mechanism 10, a continuously variable transmission 20 of a belt type, a start clutch 30 (friction clutch), a differential gear mechanism 6, and so forth, which enables torque from the engine 4 to be transferred to the drive wheels 7 and 7.

The forward/backward travel-switching mechanism 10 includes an input shaft 11, and a planetary gear device 12 mounted on the input shaft 11. The input shaft 11 has one end thereof connected to a crankshaft 4a of the engine 4 via a flywheel 5, and rotatably extends through a hollow main shaft 21. The planetary gear device 12 is comprised of a sun gear 12a, a plurality of (e.g. four) pinion gears 12b mating with the sun gear 12a, a carrier 12d rotatably supporting the pinion gears 12b, and a ring gear 12c mating with the pinion gears 12b.

The sun gear 12a is integrally formed with the input shaft 11. The input shaft 11 has an end thereof on the engine side with respect to the sun gear 12a, connected to an inner plate 13a of a forward clutch 13. An outer plate 13b of the forward clutch 13 is connected to the ring gear 12c and the main shaft 21. The engagement and disengagement of the forward clutch 13 are controlled by an ECU 2, referred to hereinafter. The carrier 12d has a reverse brake 14 connected thereto. The operation of the reverse brake 14 is also controlled by the ECU 2.

Due to the above construction, in the forward/backward travel-switching mechanism 10, when the vehicle 3 is moved forward, the revere brake 14 is released but the forward clutch 13 is engaged, whereby the input shaft 11 and the main shaft 21 are directly connected to each other, whereby the rotation of the input shaft 11 is directly transmitted to the main shaft 21 while the pinion gears 12b do not rotate about their axes and the carrier 12d idly rotates in unison with the input shaft in the same direction. Thus, during the forward movement of the vehicle 3, the main shaft 21 rotates in the same direction as the input shaft 11 at the same rotational speed.

On the other hand, when the vehicle 3 is moved backward, inversely to the above, the forward clutch 13 is disengaged but the reverse brake 14 is locked to thereby lock the carrier 12d to inhibit rotation thereof. This causes the rotation of the input shaft 11 to be transmitted to the ring gear 12c via the sun gear 12a and the pinion gears 12b, whereby the ring gear 12c and the main shaft 21 connected thereto rotate in a direction opposite to the direction of rotation of the input shaft 11. Thus, during the backward movement of the vehicle 3, the main shaft 21 rotates in the direction opposite to the direction of rotation of the input shaft 11.

The continuously variable transmission 20 is a so-called belt-type CVT, and comprised of the main shaft 21, a drive pulley 22, a driven pulley 23, a transmission belt 24, a counter shaft 25, a drive pulley width variable mechanism 26, and a driven pulley width variable mechanism 27.

The drive pulley 22 has a moving part 22a having a truncated conical shape, and a fixed part 22b. The moving part 22a is mounted on the main shaft 21 such that the moving part 22a is axially movable along the main shaft 21 but unrotatable about the same, while the fixed part 22b is disposed in a manner opposed to the moving part 22a, and fixed to the main shaft 21. Further, respective opposed surfaces of the moving part 22a and the fixed part 22b are formed to provide inclined surfaces, whereby a belt groove having a V shape is formed between the moving part 22a and the fixed part 22b, for allowing the transmission belt 24 to extend therein such that it turns around the drive pulley 22.

The drive pulley width variable mechanism 26 is for changing the pulley width (distance between the moving part 22a and the fixed part 22b) of the drive pulley 22 to thereby change the effective diameter PDRD (see FIG. 3) of the drive pulley 22, and includes a DR (drive side) oil chamber 26a formed within the moving part 22a, a DR solenoid valve 26b for controlling the oil pressure supplied to the DR oil chamber 26a, and a return spring (not shown) for urging the moving part 22a toward the fixed part 22b.

As shown in FIG. 2, the DR solenoid valve 26b is provided between an oil pressure pump 28a of the hydraulic circuit 28 and the DR oil chamber 26a within the moving part 22a, and connected to them via respective oil passages 28b and 28b. The oil pressure pump 28a is connected to the crankshaft 4a of the engine 4, for being driven by the crankshaft 4a during the operation of the engine 4, to thereby deliver the oil pressure. This causes the oil pressure delivered from the oil pressure pump 28a to be constantly supplied to the DR solenoid valve 26b via the oil passage 28b.

The DR solenoid valve 26b is of a normally-open type which is comprised of a combination of a solenoid and a spool valve (none of which is shown), and configured such that the valve opening thereof can be linearly set. Further, the DR solenoid valve 26b is controlled by the ECU2, to thereby control the oil pressure supplied from the oil pressure pump 28a to the DR oil chamber 26a via the oil passages 28b such that it becomes equal to a drive-side working oil pressure DROIL (working oil pressure).

Figure 3A:
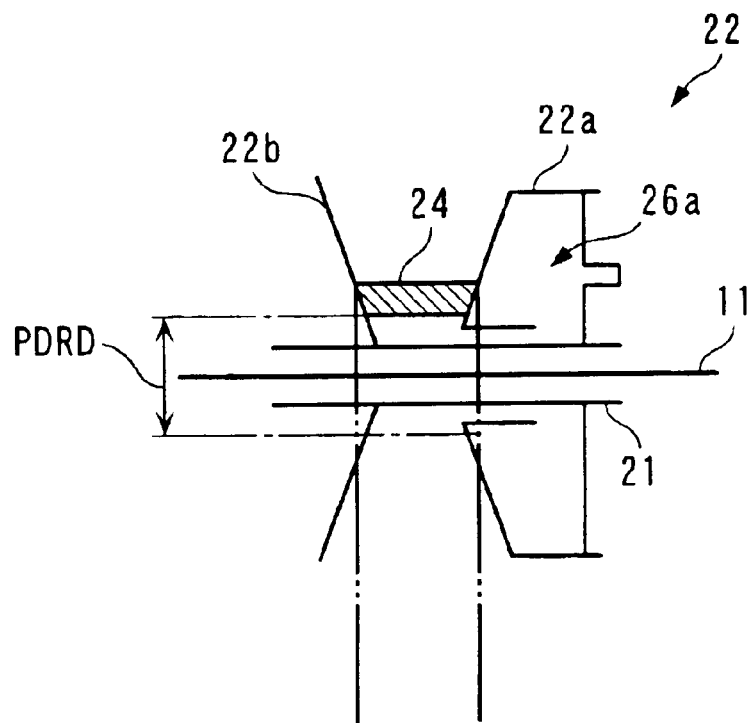
FIGS. 3A and 3B show respective examples of operations of a drive pulley.
Figure 3B:
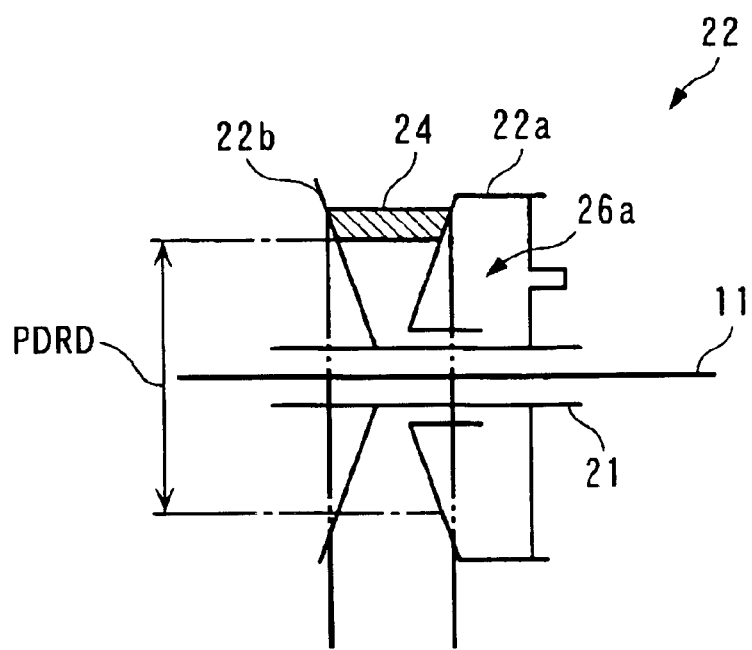

Due to the above construction, in the drive pulley width variable mechanism 26, during operation of the engine 4, the ECU 2 controls the DR solenoid valve 26b such that the moving part 22a is axially actuated, whereby the force of the moving part 22a for urging the transmission belt 24 against the fixed part 22b is controlled to continuously vary the effective diameter PDRD of the drive pulley 22 between a small diameter for a low-speed transmission ratio shown in FIG. 3A and a large diameter for a high-speed transmission ratio shown in FIG. 3B. Further, when the supply of oil pressure to the DR oil chamber 26a by the DR solenoid valve 26b is interrupted, the effective diameter PDRD of the drive pulley 22 is held such that the urging force of the return spring and the tensile force of the transmission belt 24 are balanced.

Further, the driven pulley 23 is constructed similarly to the drive pulley 22. That is, the driven pulley 23 has a moving part 23a having a truncated conical shape, and a fixed part 23b. The moving part 23a is mounted on the counter shaft 25 such that the moving part 23a is axially movable along the counter shaft 25 but unrotatable about the same, while the fixed part 23b is disposed in a manner opposed to the moving part 23a, and fixed to the counter shaft 25. Further, respective opposed surfaces of the moving part 23a and the fixed part 23b are formed to provide inclined surfaces, whereby a belt groove having a V shape is formed between the moving part 23a and the fixed part 23b, for allowing the transmission belt 24 to extend therein such that it turns around the driven pulley 23. The transmission belt 24 is a metal belt, and stretched around the pulleys 22 and 23 in a state fitted in the belt grooves thereof.

The driven pulley width variable mechanism 27 is for changing the pulley width (distance between the moving part 23a and the fixed part 23b) of the driven pulley 23 to thereby change the effective diameter PDND (see FIG. 4) thereof, and constructed similarly to the drive pulley width variable mechanism 26. That is, the driven pulley width variable mechanism 27 includes a DN (driven side) oil chamber 27a formed within the moving part 23a, a DN solenoid valve 27b for controlling the oil pressure supplied to the DN oil chamber 27a, and a return spring (not shown) for urging the moving part 23a toward the fixed part 23b.

The DN solenoid valve 27b is disposed between the oil pressure pump 28a of the hydraulic circuit 28 and the DN oil chamber 27a of the moving part 23a, and connected to them via respective oil passages 28b and 28b. This causes, during operation of the engine 4, the oil pressure delivered from the oil pressure pump 28a to be constantly supplied to the DN solenoid valve 27b via the oil passage 28b. The DN solenoid valve 27b is of a normally-open type, similarly to the DR solenoid valve 26b, which is comprised of a combination of a solenoid and a spool valve (none of which is shown). Further, the DN solenoid valve 27b is controlled by the ECU2, to thereby control the oil pressure delivered from the oil pressure pump 28a to the DN oil chamber 27a via the oil passages 28b such that it becomes equal to a driven-side working oil pressure DNOIL (working oil pressure).

Due to the above construction, in the driven-side pulley width variable mechanism 27, during operation of the engine 4, the ECU 2 controls the DN solenoid valve 27b such that the moving part 23a is axially actuated, whereby the force of the moving part 23a for urging the transmission belt 24 against the fixed part 23b is controlled to continuously vary the effective diameter PDND of the driven pulley 23 between a small diameter for a low-speed transmission ratio shown in FIG. 4A and a large diameter for a high-speed transmission ratio shown in FIG. 4B. Further, when the supply of oil pressure to the DN oil chamber 27a by the DN solenoid valve 27b is inhibited, the effective diameter PDND of the driven pulley 23 is held such that the urging force of the return spring and the tensile force of the transmission belt 24 are balanced.

As described above, in the continuously variable transmission 20, the two solenoid valves 26b and 27b are controlled by the ECU 2 to continuously vary the effective diameters PDRD and PDND of the two pulleys 22 and 23, whereby the transmission ratio RATIO (=NDR/NDN) defined as a ratio of the drive-pulley rotational speed NDR of the drive pulley 22 and the driven-pulley rotational speed NDN of the driven pulley 23 is continuously variably controlled. For example, the transmission ratio RATIO is controlled such that it is within a predetermined range (e.g. 0.4 to 2.5).

The start clutch 30 is a friction multi-plate clutch of a hydraulically controlled type which has its engagement and disengagement controlled by the supply of oil pressure, and is comprised of a multiplicity of inner plates 31 and a multiplicity of outer plates 32, a clutch engagement mechanism 33 (control means) for engaging and disengaging between these plates 31 and 32, and a return spring, not shown, for urging these plates 31 and 32 in the direction of disengagement therebetween. These inner plates 31 are connected to a gear 34 rotatably fitted on the counter shaft 25, and as the gear 34 rotates, they rotate in unison therewith. Further, the outer plates 32 are connected to the counter shaft 25, and as the counter shaft 25 rotates, they rotate in unison therewith.

The clutch engagement mechanism 33 is comprised of a clutch oil chamber 33a and an SC solenoid valve 33b. As shown in FIG. 2, the SC solenoid valve 33b is disposed between the oil pressure pump 28a of the hydraulic circuit 28 and the clutch chamber 33a, and connected to them via the oil passages 28b and 28b.

The SC solenoid valve 33b is of a normally-closed type which is comprised of a combination of a solenoid and a spool valve (none of which are shown), and configured as a linear solenoid valve in which the valve opening thereof can be linearly set. Further, the SC solenoid valve 33b is controlled by the ECU 2 such that the oil pressure supplied from the oil pressure pump 28a to the clutch oil chamber 33a via the oil passages 28b becomes equal to a target oil pressure PCCMDL (clutch transfer torque). Further, the gear 34 mates with a gear 6a of the differential gear mechanism 6 via large and small idler gears 35a and 35b provided on an idler shaft 35.

Due to the above construction, during operation of the engine 4, when the solenoid of the SC solenoid valve 33b is excited by the control of the ECU 2, the oil pressure is supplied to the oil pressure chamber 33a, whereby frictional forces are generated between the inner plates 31 and the outer plates 32, whereby the start clutch 30 is engaged. As a consequence, the rotation and torque of the counter shaft 25 is transmitted to the drive wheels 7 and 7. During the transmission, in the start clutch 30, as the oil pressure supplied to the clutch oil chamber 33a is higher, the engaging force of the start clutch 30 becomes larger, whereas when the supply of the oil pressure is inhibited, the start clutch 30 is held in a disengaged state by the urging force of the return spring.

The engine 4 has a throttle valve 8 arranged in an intake pipe 4b thereof, and the throttle valve 8 is connected to the rotational shaft of a motor 9 implemented by a DC motor. The opening TH of the throttle valve 6 (hereinafter referred to as the "throttle valve opening") is controlled by the ECU 2 which controls a duty factor of drive current supplied to the motor 9.

Also connected to the ECU 2 are a crankshaft sensor 40, a throttle valve opening sensor 41, an intake pipe absolute pressure sensor 42, an accelerator pedal opening sensor 43, a drive-pulley rotational speed sensor 44, a driven-pulley rotational speed sensor 45 (clutch slippage degree-detecting means), an idler shaft rotational speed sensor 46 (clutch slippage degree-detecting means), and a shift position sensor 47.

The crank angle sensor 40 is formed by a combination of a magnet rotor and an MRE pickup (none of which are shown), and delivers a CRK signal, which is a pulse signal, to the ECU 2 along with rotation of the crankshaft 4a. Each pulse of the CRK signal is generated whenever the crankshaft 4a rotates through a predetermined crank angle (e.g. 30 degrees), and the ECU 2 calculates the rotational speed NE of the engine 4 (hereafter referred to as "the engine speed") based on the CRK signal.

The throttle valve opening sensor 41 (throttle valve opening-detecting means) detects the throttle valve opening TH; the intake pipe absolute pressure sensor 42 detects an intake pipe absolute pressure PBA which is the absolute pressure within the intake pipe 4b of the engine 4; and the accelerator pedal opening sensor 43 detects the accelerator pedal opening AP, which is a degree of opening i.e. stepped-on amount of an accelerator pedal, not shown, of the vehicle 3. Respective signals indicative of detected parameters of operating conditions of the engine 4 are delivered to the ECU 2. Further, the ECU 2 controls the throttle valve opening TH according to the accelerator pedal opening AP.

Further, the drive-pulley rotational speed sensor 44 detects the drive-pulley rotational speed NDR, which is the rotational speed of the drive pulley 22; the driven-pulley rotational speed sensor 45 detects the driven-pulley rotational speed NDN, which is the rotational speed of the driven pulley 23; and the idler shaft rotational speed sensor 46 detects an idler shaft rotational speed NDI, which is the rotational speed of the idler shaft 35. Respective signals indicative of the rotational speeds detected by these sensors are delivered to the ECU 2. The ECU 2 calculates the transmission ratio RATIO based on the drive-pulley rotational speed NDR and the driven-pulley rotational speed NDN. Further, the ECU 2 calculates a slippage rate ESC (clutch slippage degree) of the start clutch 30 based on the drive-pulley rotational speed NDN and the idler shaft rotational speed NDI, and calculates the vehicle speed VP based on the idler shaft rotational speed NDI.

The shift position sensor 47 detects which of shift ranges "P", "R", "N", "D", and "S (sports)", and "L" the position of a shift lever, not shown, is in, and delivers a signal POSI indicative of the detected position of the shift lever to the ECU 2. The range S is a shift range for the forward travel, and when the shift lever is in the range S, the transmission ratio RATIO is controlled to a value slightly larger than when the same is in the range D.

The ECU 2 forms, in the present embodiment, transmission transfer torque-setting means, clutch transfer torque-setting means, bad road-determining means, target transmission ratio-setting means, transmission ratio control means, throttle valve opening-correcting means, working oil pressure-setting means, output torque change amount-detecting means, clutch slippage degree-detecting means, and control means, and is implemented by a microcomputer comprised of a CPU, a RAM, a ROM, and an I/O interface. The ECU 2 sets the drive-side and driven-side working oil pressures DROIL and DNOIL, and the target oil pressure PCCMDL based on the detection signals input from the above-mentioned sensors 40 to 47, calculates a drive-side transfer torque TQDRBLTM (transmission transfer torque) to be transferred from the drive pulley 22 to the driven pulley 23, and a driven-side transfer torque TQDNBLTM (transmission transfer torque) to be transferred from the driven pulley 23 to the drive wheels 7 and 7, and sets a target transmission ratio RATTGT for control of the transmission ratio RATIO, to thereby control the speed varying operation of the continuously variable transmission 20.

Figure 5:
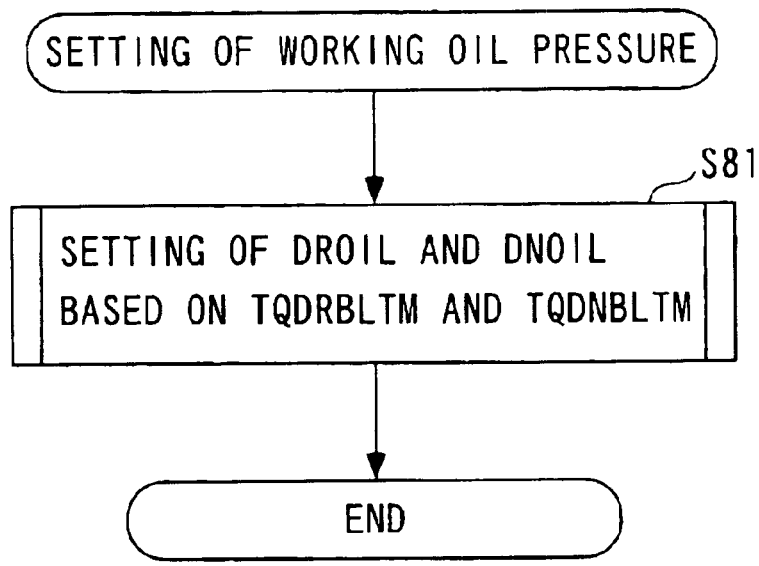
FIG. 5 is a flowchart showing a working oil pressure-setting process.

FIG. 5 is a flowchart showing a working oil pressure-setting process. This process is executed whenever a predetermined time period elapses. In a step 81 (indicated by S81; all steps referred to hereinafter are indicated in the same manner in the drawings), the drive-side working oil pressure DROIL is set based on the drive-side transfer torque TQDRBLTM, and the driven-side working oil pressure DNOIL is set based on the driven-side transfer torque TQDNBLTM. The drive-side and driven-side working oil pressures DROIL and DNOIL are set to larger values as the drive-side and driven-side transfer torques TQDRBLTM and TQDNBLTM are larger. This is because as the torques to be transmitted by the drive pulley 22 and the driven pulley 23 are larger, there is a higher possibility of slippage of the transmission torque, and hence, the sandwiching forces applied to the transmission belt 24 at the drive pulley 22 and the driven pulley 23 are increased to prevent the slippage of the transmission belt 24.

Figure 6:
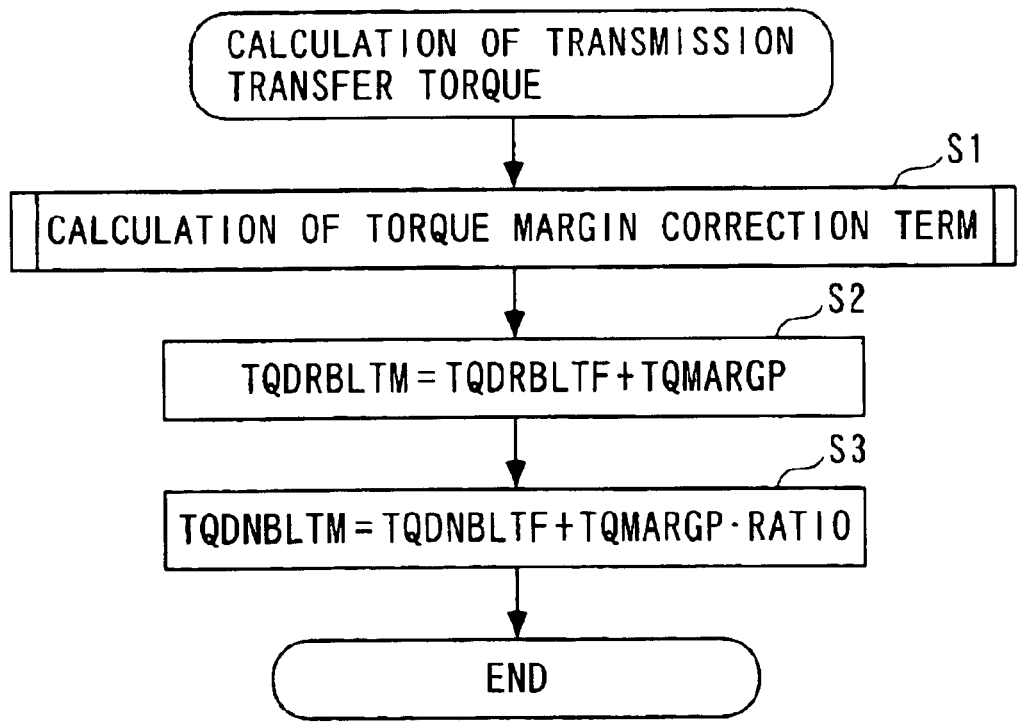
FIG. 6 is a flowchart showing a transmission transfer torque-calculating process.

FIG. 6 is a flowchart showing a transmission transfer torque-calculating process. This process is for calculating the drive-side transfer torque TQDRBLTM and the driven-side transfer torque TQDNBLTM, and executed whenever a predetermined time period (e.g. 10 msec.) elapses. First, in a step 1, a torque margin correction term-calculating process is executed. In this process, a torque margin correction term TQMARGP is calculated as described hereinafter. Then, in a step 2, the drive-side transfer torque TQDRBLTM is calculated using the torque margin correction term TQMARGP by the following equation (1):

$$TQDRBLTM = TQDRBLTF + TQMARGP \quad (1)$$

wherein TQDRBLTF represents a basic value of the drive-side transfer torque TQDRBLTM, which is set based on the engine speed NE and the intake pipe absolute pressure PBA.

Then, in a step 3, the driven-side transfer torque TQDNBLTM is calculated using the torque margin correction term TQMARGP and the transmission ratio RATIO by the following equation (2):

$$TQDNBLTM = TQDNBLTF + TQMARGP \cdot RATIO \quad (2)$$

wherein TQDNBLTF represents a basic value of the driven-side transfer torque TQDNBLTM, which is set to a value calculated by multiplying the basic value TQDRBLTF of the drive-side transfer torque calculated in the step 2 by the transmission ratio RATIO.

Figure 7:
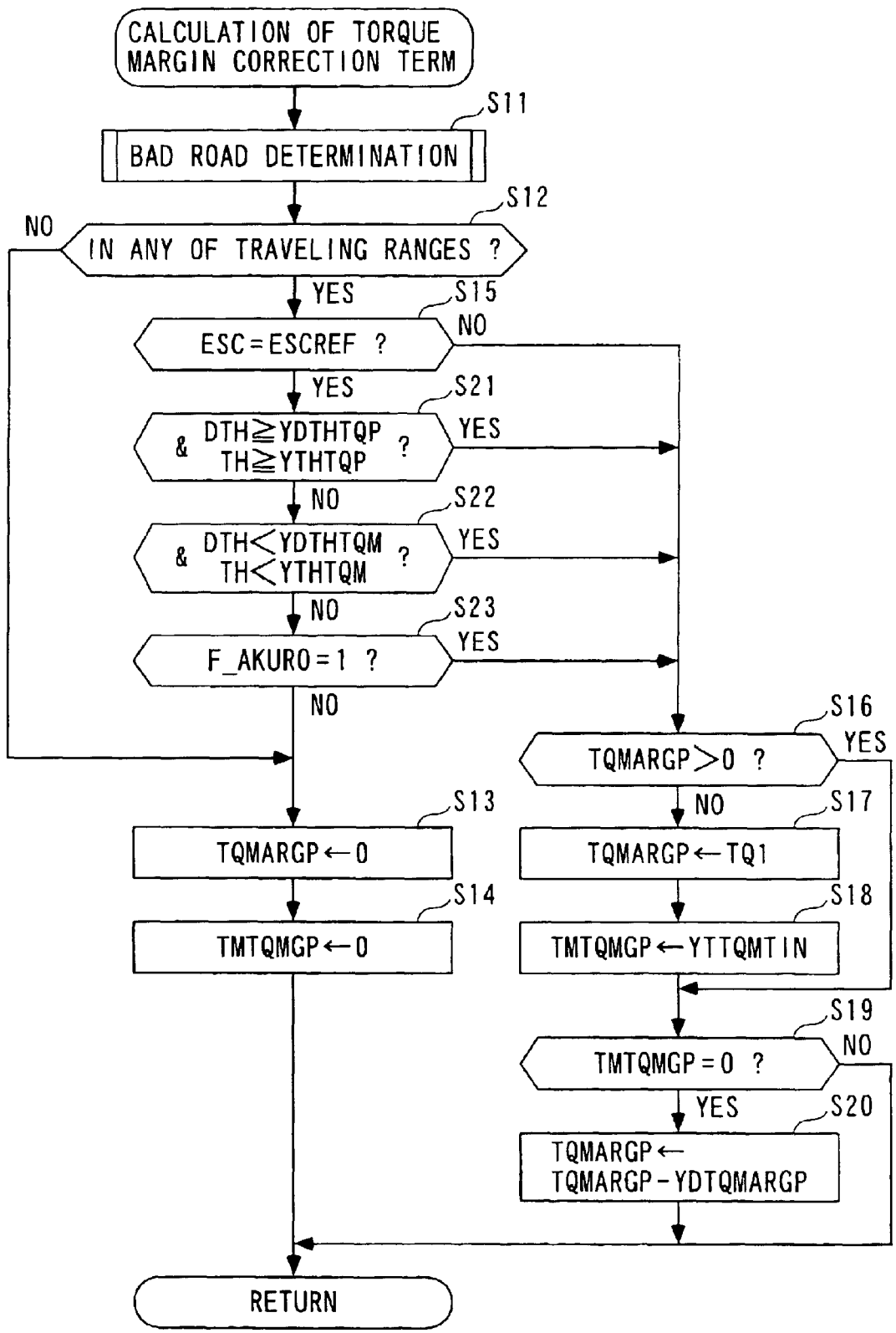
FIG. 7 is a flowchart showing a torque margin correction term-calculating process.
Figure 8:
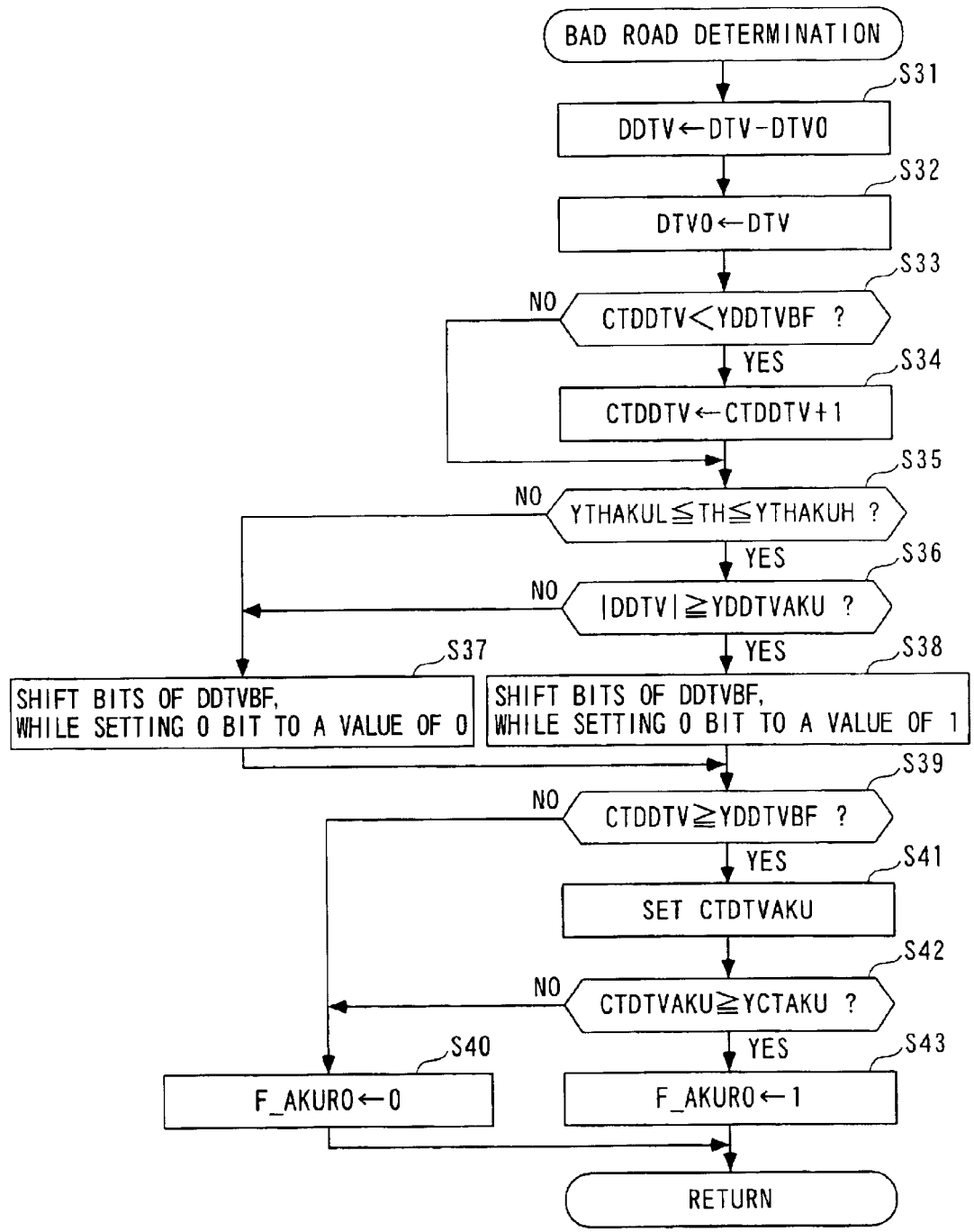
FIG. 8 is a flowchart showing a bad road-determining process.

FIG. 7 is a flowchart showing the subroutine of the torque margin correction term-calculating process executed in the step 1 in FIG. 6. First, in a step 11, a bad road-determining process is executed. FIG. 8 is a flowchart showing the subroutine of the bad road-determining process. First, in a step 31, the difference between the current value DTV and the immediately preceding value DTV0 of a vehicle speed change amount indicative of the difference between the respective values of the vehicle speed VP detected in the immediately preceding loop and the current loop is set to a change amount difference DDTV. Then, the current value of the vehicle speed change amount DTV obtained in the current loop is shifted to the immediately preceding value DTV0 thereof (step 32).

Then, it is determined in a step 33 whether or not a pointer value CTDDTV is smaller than a predetermined value YDDTVBF (e.g. 8). If the answer to this question is affirmative (YES), the pointer value CTDDTV is incremented in a step 34, and the program proceeds to a step 35, whereas if the answer is negative(NO), the program skips over the step 34 to the step 35. It should be noted that the pointer value CTDDTV is set to a value of 0 when the engine 4 is started.

In the step 35 and the following step 36, it is determined whether or not the throttle valve opening TH is within a predetermined range defined by a first predetermined reference value YTHAKUL and a second predetermined reference value YTHAKUH, and whether or not the absolute value |DDTV| of the change amount difference set in the step 31 is equal to or larger than a predetermined value YDDTVAKU. The predetermined value YDDTVAKU is set to a value larger than a range of values which the change amount of acceleration of the vehicle 3 should assume when the throttle valve opening TH is within the above predetermined range.

If either of the answers to the questions of the steps 35 and 36 is negative (NO), it is provisionally determined that the vehicle 3 is not traveling on a bad road, and the bits of a buffer DDTVBF are shifted, while setting the 0 bit to a value of 0 in a step 37, followed by the program proceeding to a step 39.

On the other hand, if both of the answers to the steps 35 and 36 are affirmative (YES), i.e. if the throttle valve opening TH is within the predetermined range and the absolute value |DDTV| of the change amount difference is equal to or larger than the predetermined value YDDTVAKU, it is provisionally determined that the vehicle 3 is traveling on a bad road, and the bits of the buffer DDTVBF are shifted, while setting the 0 bit to a value of 1 in a step 38, followed by the program proceeding to the step 39.

In the step 39, it is determined whether or not the pointer value CTDDTV is equal to or larger than the predetermined value YDDTVBF. If the answer to this question is negative (NO), a bad road determination flag F_AKURO is set to 0 in a step 40, followed by terminating the present program.

If the answer to the question of the step 39 is affirmative (YES9, i.e. if data whose number is equal to the predetermined value YDDTVBF are stored in the buffer DDTVBF, a bad road provisional determination count CTDTVAKU is set to the total sum of the newest data corresponding in number to the predetermined value YDDTVBF in a step 41.

Then, it is determined in a step 42 whether or not the bad road provisional determination count CTDTVAKU is equal to or larger than a predetermined value YCTAKU (e.g. 4). If the answer to this question is affirmative (YES), which means that within a time period corresponding to the predetermined value YDDTVBF, a state in which the throttle valve opening TH is within the predetermined range and at the same time the vehicle speed change amount DTV is largely changed is detected predetermined number YCTAKU or more times, i.e. frequently detected, it is determined that the vehicle 3 is traveling on a bad road, and the bad road determination flag F_AKURO is set to 1, in a step 43, followed by terminating the present program. The predetermined value YCTAKU is set to a value with hysteresis.

If the answer to the question of the step 42 is negative (NO), it is determined that the vehicle is not traveling on a bad road, and the above step S40 is executed, followed by terminating the program.

Referring again to FIG. 7, in a step 12 following the step 11, it is determined whether or not the position of the shift lever is in any of traveling ranges "D", "S", and "R". If the answer to this question is negative (NO), the torque margin correction term TQMARGP is set to a value of 0 in a step 13, and the timer value of a delay timer of a down-count type is set to a value of 0, in a step 14, followed by terminating the present program, whereas if the answer to the question of the step 12 is affirmative (YES), i.e. if the position of the shift lever is in one of the traveling ranges, it is determined in a step 15 whether or not the slippage rate ESC of the start clutch 30 is equal to a predetermined value ESCREF (e.g. 100%) which represents a state in which no slippage occurs.

If the answer to this question is negative (NO), i.e. if the start clutch 30 slips, it is determined in a step 16 whether or not the torque margin correction term TQMARGP is larger than a value of 0. If the answer to this question is negative (NO), the torque margin correction term TQMARGP is set to a relatively small initial value TQ1 (e.g. 2.0 N·m) in a step 17, and the timer value TMTQMGP of the delay timer is set to a first predetermined time period YTTQMTIN (e.g. 0.6 sec.) in a step 18, followed by the program proceeding to a step 19. After the step 17 is executed, the answer to the question of the step 16 becomes affirmative (YES), so that in this case, the program skips over the steps 17 and 18 to the step 19.

In this step 19, it is determined whether or not the timer value TMTQMGP of the delay timer set in the step 18 is equal to a value of 0. If the answer to this question is negative (NO), the program is immediately terminated, whereas if the answer is affirmative (YES), i.e. if the first predetermined time period YTTQMTIN has elapsed after setting the delay timer TMTQMGP, a value obtained by subtracting a predetermined subtrahend term YDTQ-MARGP (e.g. 0.001 kgf·m) from the current value of the torque margin correction term TQMARGP is set to the updated current value of the torque margin correction term TQMARGP in a step 20, followed by terminating the present program.

On the other hand, if the answer to the question of the step 15 is affirmative (YES), i.e. if the start clutch 30 does not slip, it is determined in a step 21 whether or not the difference DTH (change amount of the output torque) between the current value and the immediately preceding vale of the throttle valve opening TH is equal to or larger than a first predetermined value YDTHTQP (e.g. 20 degrees)(predetermined value) thereof, and at the same time, the throttle valve opening TH is equal to or larger than a first predetermined value YTHTQP (e.g. 20 degrees). The first predetermined values YDTHTQP and YTHTQP are set with hysteresis.

If the answer to this question is affirmative (YES), which means that the difference DTH of the throttle valve opening TH is very large and at the same time the throttle valve opening TH is very large (hereinafter, this state is referred to as "chip-in"), i.e. if the throttle valve 8 is suddenly opened, it is determined that the output of the engine 4 is suddenly increased, so that the step 16 et seq. are executed, followed by terminating the program. On the other hand, if the answer to the question is negative (NO), it is determined in a step 22 whether or not the difference DTH of the throttle valve opening TH is smaller than a second predetermined value YDTHTQM (e.g. −20 degrees (predetermined value) thereof) which is a negative value, and at the same time, the throttle valve opening TH is smaller than a second predetermined value YTHTQM (e.g. 10 degrees) smaller than the first predetermined value. The second predetermined values YDTHTQM and YTHTQPM are also set with hysteresis.

If the answer to this question is affirmative (YES), i.e. if the difference DTH of the throttle valve opening TH is a negative value and the absolute value thereof is vary large, and the throttle valve opening TH is very small (hereinafter, this state is referred to as "chip-out"), i.e. the throttle valve 8 is suddenly closed, it is judged that the output of the engine 4 is suddenly decreased, so that the step 16 et seq. are executed, followed by terminating the present program. On the other hand, if the answer to the question is negative (NO), it is determined in a step 23 whether or not the bad road determination flag F_AKURO set in the bad road-determining process in FIG. 8 is equal to 1. If the answer to this question is affirmative (YES), i.e. if it is determined that the vehicle 3 is traveling on a bad road, the step 16 et seq. are executed, followed by terminating the present program.

On the other hand, if the answer to the question of the step 23 is negative (NO), i.e. if it is determined that the start clutch 30 is engaged, the engine 4 is neither in the chip-in or in the chip-out, and at the same time the vehicle 3 is not traveling on a bad road, the step 13 et seq. are executed, followed by terminating the present program.

As described above, when it is determined that the engine 4 is in the chip-in or the chip-out, the vehicle 3 is traveling on a bad road, or the start clutch 30 slips, the torque margin correction term TQMARGP is set to the relatively small initial value TQ1. By applying the torque margin correction term TQMARGP to the above-described equations (1) and (2), the drive-side and driven-side transfer torques TQDRBLTM and TQDNBLTM are slightly increased. This makes it possible to positively prevent the slippage of the transmission belt 24. Further, this torque margin correction term TQMARGP is held at the initial value TQ1 until the first predetermined time period YTTQMTIN elapses, and thereafter, it is progressively decreased by the application of the subtrahend term YDTQMARGP.

Figure 9:
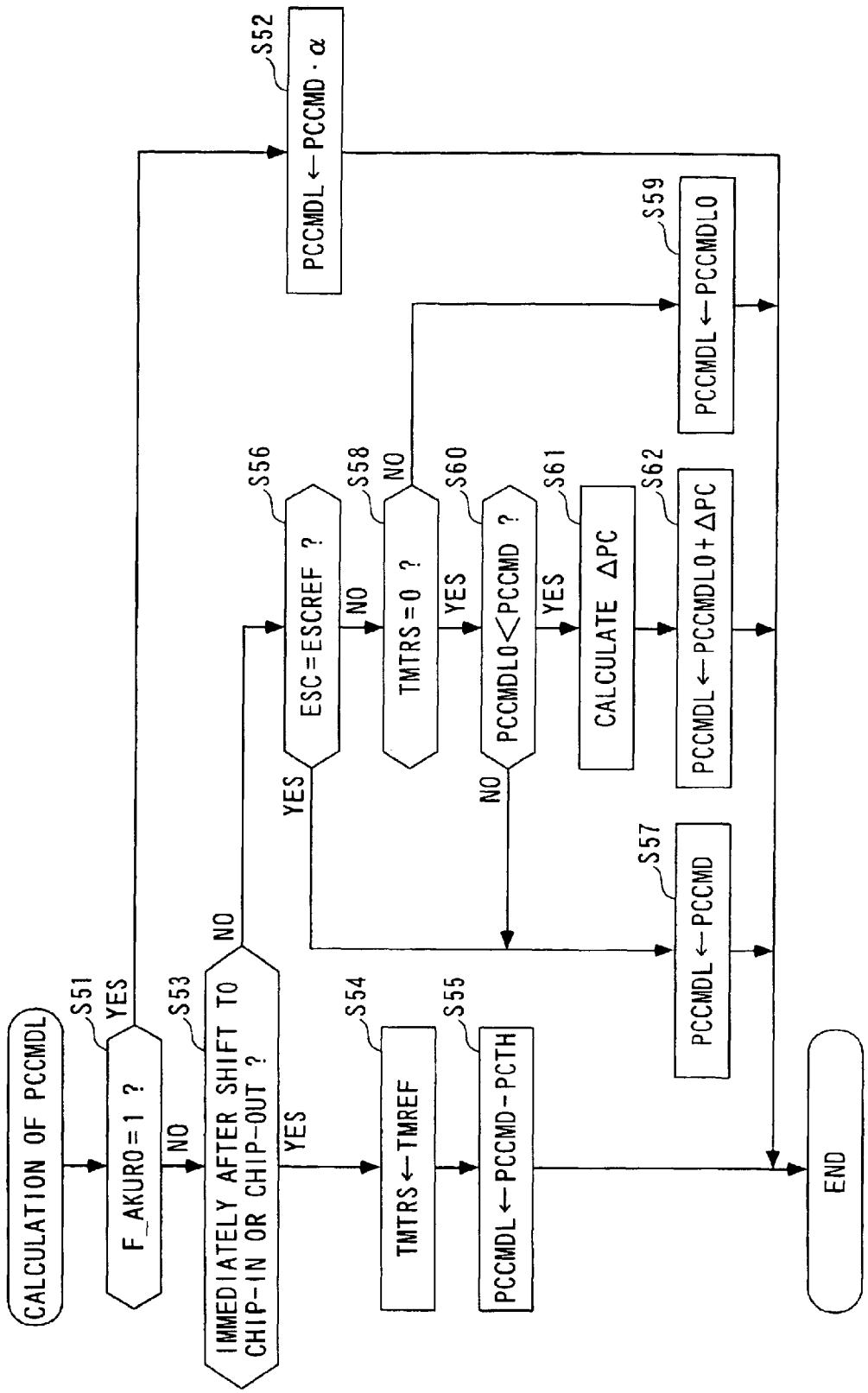
FIG. 9 is a flowchart showing a PCCMDL-calculating process.

FIG. 9 is a flowchart showing a PCCMDL-calculating process for calculating the target oil pressure PCCMDL for control of the engaging force of the start clutch 30. First, in a step 51, it is determined whether or not the bad road determination flag F_AKURO is equal to 1. If the answer to this question is affirmative (YES), i.e. if it is determined that the vehicle 3 is traveling on a bad road, the target oil pressure PCCMDL is set to a value obtained by multiplying a basic value PCCMD thereof by a predetermined reduction coefficient α (e.g. 0.8) smaller than a value of 1.0 (step 52), followed by terminating the present program. This causes, when it is determined that the vehicle 3 is traveling on a bad road, the engaging force of the start clutch 30 is reduced, whereby the slippage of the start clutch 30 is allowed. It should be noted that the basic value PCCMD is set to a value obtained by adding the urging force of the return spring of the start clutch 30 to the product of multiplication of the engine torque, the transmission ratio RATIO, and a predetermined coefficient, and when this value is applied to the target oil pressure PCCMDL, the engaging force of the start clutch 30 becomes sufficiently strong, so that no slippage of the start clutch 30 occurs. The engine torque is set depending on the engine speed NE and the intake pipe absolute pressure PBA.

On the other hand, if the answer to the question of the step 51 is negative (NO), i.e. if F_AKURO=0 holds, it is determined whether the current loop is immediately after the engine 4 has shifted to the chip-in or chip-out (step 53). If the answer to this question is affirmative (YES), the timer value TMTRS of a delay timer of a down-count type is set to a predetermined time period TMREF (e.g. 0.5 sec.) in a step 54, and the target oil pressure PCCMDL is set to an initial value obtained by subtracting a predetermined value PCTH (e.g. 1 kgf/cm$^2$) from the basic value PCCMD in a step 55, followed by terminating the present program. This reduces the engaging force of the start clutch 30 to allow slippage thereof.

On the other hand, if the answer to the question of the step 53 is negative (NO), i.e. if the current loop is immediately after the engine 4 has shifted to the chip-in or chip-out, it is determined in a step 56 whether or not the slippage rate ESC is equal to the predetermined slippage value ESCREF used in the step 15 in FIG. 7. If the answer to this question is negative (NO), i.e. if the start clutch 30 slips due to execution of the step 54, it is determined in a step 58 whether or not the timer value TMTRS of the delay timer set in the step 54 is equal to a value of 0.

If the answer to this question is negative (NO), i.e. if the predetermined time period TMREF has not elapsed after the shift to the chip-in or chip-out, the immediately preceding value PCCMDL0 of the target oil pressure applied in the immediately preceding loop is set to the current value PCCMDL of the target oil pressure (step 59), followed by terminating the present program. On the other hand, if the answer to the question of the step 58 is affirmative (YES), it is determined in a step 60 whether or not the immediately preceding value PCCMDL0 of the target oil pressure is smaller than the basic value PCCMD.

Figure 10:
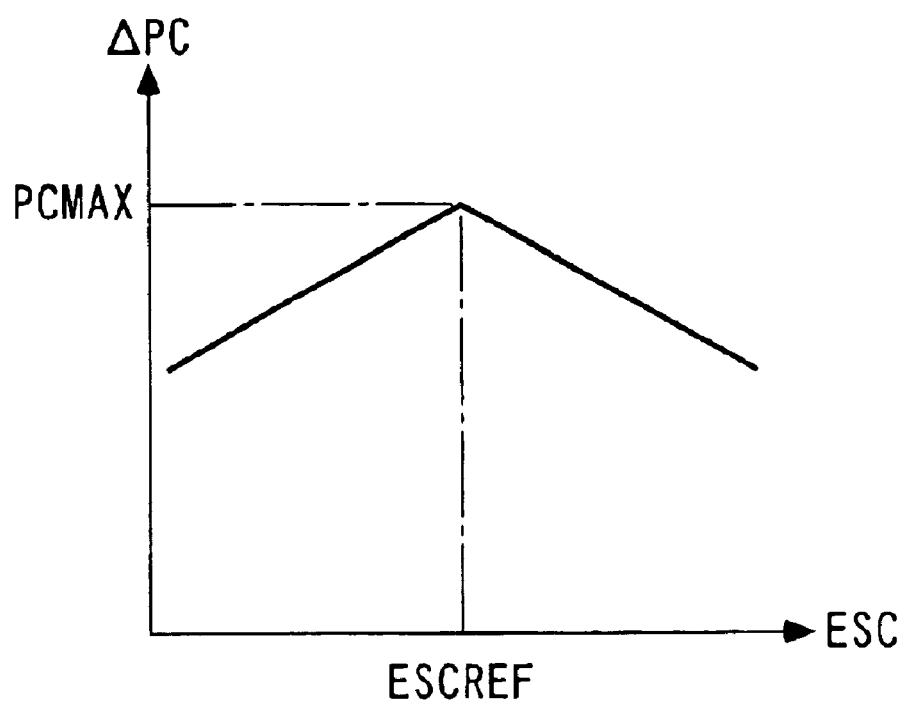
FIG. 10 is a diagram showing an example of an ESC-ΔPC table.

If the answer to this question is affirmative (YES), i.e. if PCCMDL0<PCCMDL holds, a correcting addend term ΔPC is calculated (step 61). The correcting addend term ΔPC is calculated by searching an ESC-ΔPC table shown in FIG. 10 according to the slippage rate ESC. In this table, the correcting addend term ΔPC is set to the maximum value PCMAX (e.g. 0.5 kgf/cm$^2$) when the slippage rate ESC is equal to the predetermined slippage value ESCREF, and as the slippage rate ESC becomes farther from the predetermined slippage value ESCREF, it is linearly set to a smaller value.

Then, the target oil pressure PCCMDL is calculated as a value obtained by adding the correcting addend term ΔPC calculated in the step 61 to the immediately preceding value PCCMDL0 of the target oil pressure (step 62), followed by terminating the program.

On the other hand, if the answer to the question of the step 60 is negative (NO), i.e. if the target oil pressure PCCMDL calculated in the step 62 has reached the basic value PCCMD, the target oil pressure PCCMDL is set to the basic value PCCMD (step 57), followed by terminating the present program.

Further, if the answer to the question of the step 56 is affirmative (YES), i.e. if the start clutch 30 does not slip, the target oil pressure PCCMD is set to the basic value PCCMD (step 57), followed by terminating the present program.

As described above, when the chip-in or chip-out is detected, the target oil pressure PCCMDL is set to an initial value obtained by subtracting the predetermined value PCTH from the basic value PCCMD, and then, it is held at the initial value until the second predetermined time period TMREF elapses, whereafter it is progressively increased to the basic value PCCMD by adding the correcting addend term ΔPC thereto each time.

Figure 11:
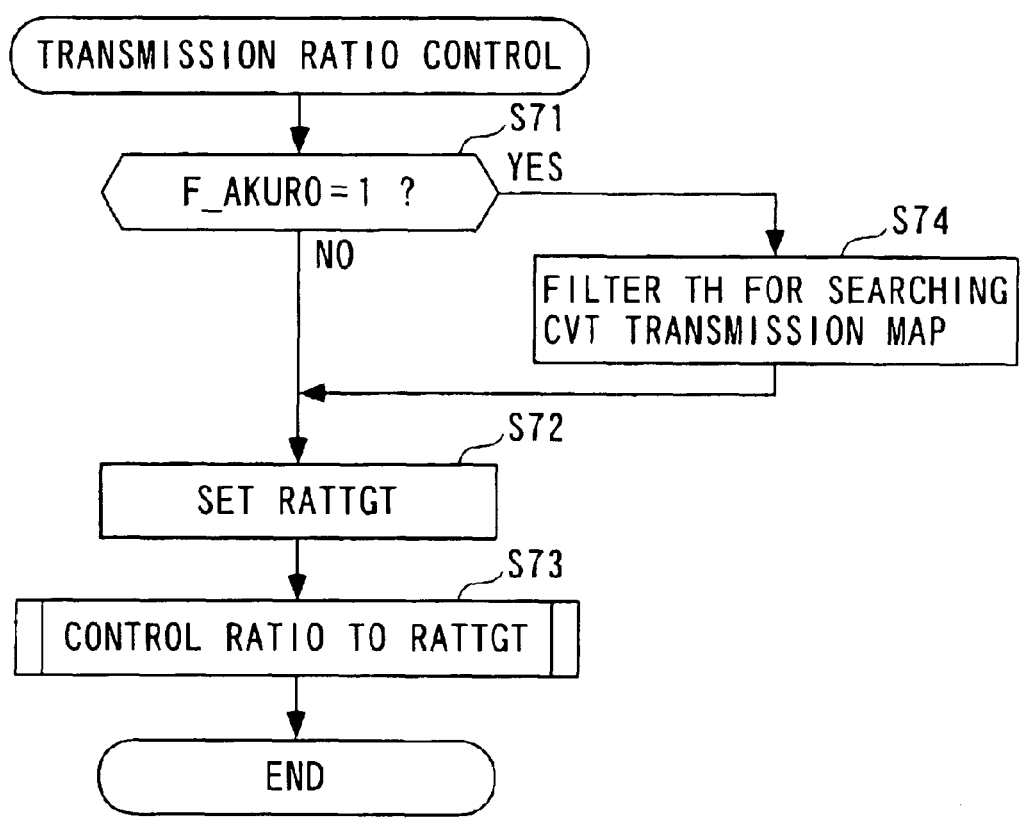
FIG. 11 is a flowchart showing a transmission ratio control process.

FIG. 11 is a flowchart showing a transmission ratio control process for control of the transmission ratio RATIO of the continuously variable transmission 20. First, in a step 71, it is determined whether or not the bad road determination flag F_AKURO is equal to 1. If the answer to this question is negative (NO), the target transmission ratio RATTGT is set by searching a CVT transmission map according to the vehicle speed VP and the throttle valve opening TH (step 72). Further, the drive-side and driven-side working oil pressures DROIL and DNOIL are controlled such that the actual transmission ratio RATIO becomes equal to the set target transmission ratio RATTGT (step 73), followed by terminating the present program.

On the other hand, if the answer to the question of the step 71 is affirmative (YES), i.e. if it is determined the vehicle 3 is traveling on a bad road, the throttle valve opening TH for use in searching the CVT transmission map is subjected to filtering (step 74) and at the same time, the step 72 et seq. are executed, followed by terminating the present program. This filtering is executed by the method of weighted average, the method of moving average, or a first-order filter. Detailed description thereof is omitted.

As described above, according to the present embodiment, by executing the steps 51 and 52 in FIG. 9, the target oil pressure PCCMDL is reduced by multiplying the basic value PCCMD by the reduction coefficient α to thereby allow the start clutch 30 to slip, so that the inertia torque generated by the drive wheels 7 and 7 when they land on the road surface is relieved by the start clutch 30 to thereby suppress the degree of transfer of the inertia torque to the engine 4, whereby the fluctuation of the engine speed NE can be suppressed. This contributes to improved drivability. Further, since the inertia torque can be relieved via the start clutch 30, it is possible to prevent the transmission belt 24 from slipping, and reduce load on the transmission belt 24, whereby it becomes unnecessary to increase the drive-side and driven-side working oil pressures DROIL and DNOIL more to little too high levels. This contributes to increased life of the transmission belt 24 and improved fuel economy.

Further, through execution of the step 74, the throttle valve opening TH for use in searching the CVT transmission map when it is determined that the vehicle 3 is traveling on a bad road is subjected to filtering, which makes it possible to eliminate the adverse influence of the fluctuation of the accelerator pedal opening AP caused by traveling on a bad road, on the throttle valve opening TH. This makes it possible to prevent fluctuation of the target transmission ratio RATTGT set according to the throttle valve opening TH, and therefore stabilize the transmission ratio RATIO and the engine speed NE.

Moreover, through execution of the steps 53 and 55, when the engine 4 is in the chip-in or the chip-out, by subtracting the predetermined value PCTH from the basic value PCCMD, the target oil pressure PCCMDL is reduced to allow slippage of the start clutch 30, whereby the output torque of the engine 4 which has been suddenly changed can be relieved via the start clutch 30. This makes it unnecessary to transfer the output torque which has been suddenly changed via the continuously variable transmission 2 as it is, and therefore, it is possible to prevent the transmission belt 24 from slipping and reduce load on the same, whereby it becomes unnecessary to increase the drive-side and driven-side working oil pressures DROIL and DNOIL to little too high levels. Therefore, in this case as well, the same advantageous effects as obtained when it is determined that the vehicle is traveling on a bad road can be obtained. Further, no jerky feeling occurs any longer which can be caused when the accelerator pedal is suddenly stepped on and released, enabling drivability to be maintained.

Further, through execution of the steps 61 and 62, by setting the correcting addend term ΔPC for use in progressively increasing the target oil pressure PCCMDL to a smaller value as the slippage rate ESC is farther from the predetermined slippage value ESCREF, i.e. as the degree of slippage of the start clutch 30 is larger, it is possible to set the target oil pressure PCCMDL to a small value initially when the degree of slippage of the start clutch 30 is large, and progressively increase the same as the degree of slippage of the start clutch 30 becomes smaller, which makes it possible to smoothly engage the start clutch 30. Therefore, it is possible to prevent generation of inertia torque which could be caused by a sudden engagement of the start clutch 30, so that it becomes unnecessary to set the drive-side and driven-side working fluid oil pressures DROIL and DNOIL to little too high levels. Further, through execution of the step 58, the start clutch 30 is smoothly engaged after waiting for the suddenly changed output of the engine 4 to become stable, which makes it possible to more positively prevent the inertia torque from being generated.

Figure 12:
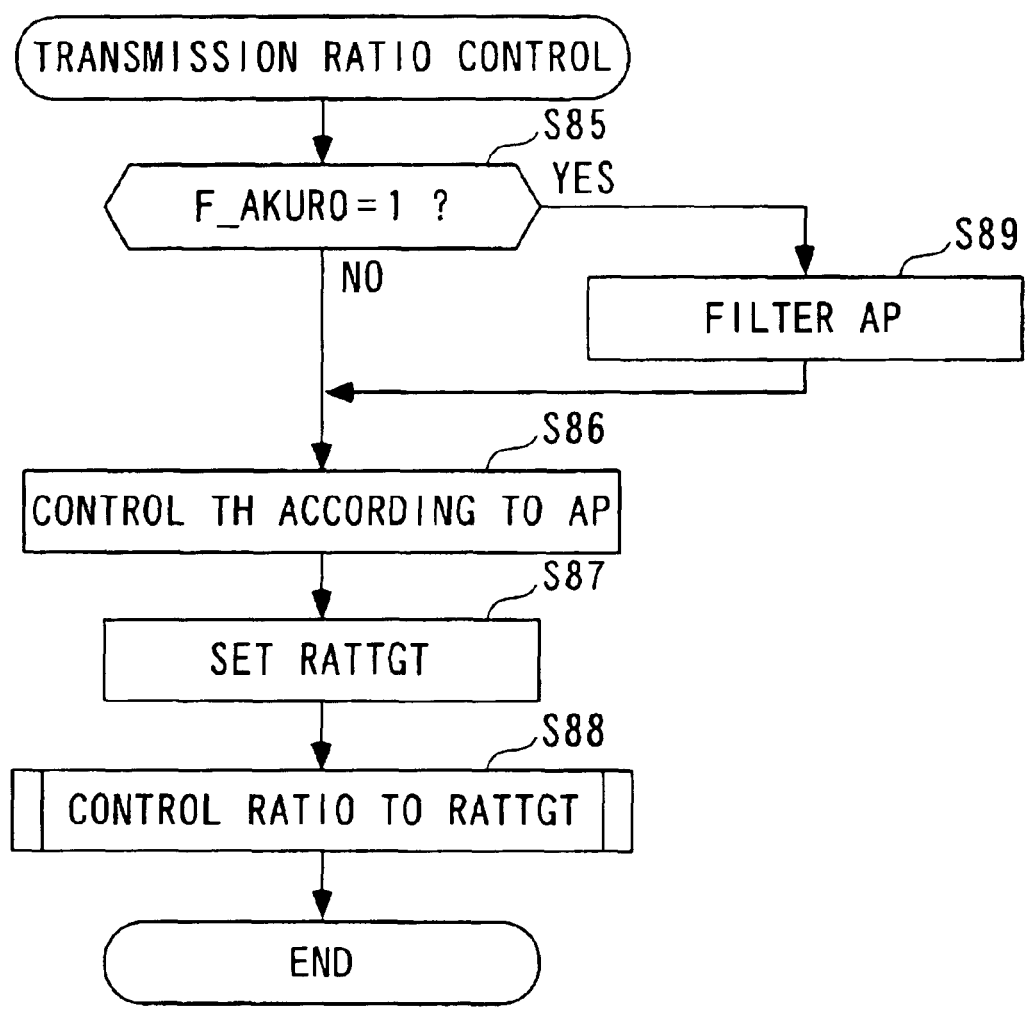
FIG. 12 is a flowchart showing another example of the transmission ratio control process.

FIG. 12 shows a variation of the transmission ratio control process shown in FIG. 11. This variation is distinguished from the FIG. 11 process in that the accelerator pedal opening AP is corrected instead of the throttle valve opening TH since the throttle valve opening TH is controlled according to the accelerator pedal opening AP. First, in a step 85, it is determined whether or not the bad road determination flag F_AKURO is equal to 1. If the answer to this question is negative (NO), the throttle valve opening TH is controlled according to the accelerator pedal opening AP (step 86). Further, similarly to the step 72, the target transmission ratio RATTGT is set (step 87), and similarly to the step 73, the drive-side and driven-side working oil pressures DROIL and DNOIL are controlled such that the actual transmission ratio RATIO becomes equal to the calculated target transmission ratio RATTGT (step 88), followed by terminating the present program.

On the other hand, if the answer to the question of the step 85 is affirmative (YES), i.e. if it is determined that the vehicle 3 is traveling on a bad road, the accelerator pedal opening AP is subjected to filtering (step 89), and the step 86 et seq. are executed, followed by terminating the present program. This filtering is also executed by the method of weighted average, the method of moving average, or the first-order filtering.

As described above, when it is determined that the vehicle is traveling on a bad road, by carrying out filtering on the accelerator pedal opening AP, it is possible to eliminate fluctuations in the accelerator pedal opening caused by stepping-on and releasing operations not intended by the driver, which prevents the throttle valve opening TH from being fluctuated, and therefore, in this case as well, it is possible to stabilize the transmission ratio RATIO and the engine speed NE.

Next, a second embodiment of the present invention will be described with reference to FIG. 13. This embodiment is distinguished from the first embodiment in the details of the transmission transfer torque-calculating process. Therefore, the following description will be given on the different points. First, in a step 91, it is determined whether or not the slippage rate ESC is equal to the predetermined slippage value ESCREF. If the answer to this question is affirmative (YES), i.e. if the start clutch 30 is engaged without allowing slippage, in steps 92 and 93, the drive-side and driven-side transfer torques TQDRBLTM and TQDNBLTM are set to basic values TQDRVLTF and TQDNBLTF, respectively, followed by terminating the present program. These basic values TQDRBLTF and TQDNBLTF are calculated similarly to the steps 2 and 3 in FIG. 6.

On the other hand, if the answer to the question of the step 91 is negative (NO), i.e. if the start clutch 30 slips, the clutch transfer torque TQCL is calculated according to the target oil pressure PCCMDL (step 94). The clutch transfer torque TQCL is a torque to be transmitted via the start clutch 30 to the drive wheels 7 and 7, and as the target oil pressure PCCMDL is larger, it is calculated as a linearly increased value.

Then, it is determined in a step 95 whether or not the bad road determination flag F_AKURO is equal to 1. If the answer to this question is negative (NO), i.e. if it is determined that the vehicle 3 is not traveling on a bad road, it is determined in a step 96 whether or not the timer value TMTRS of the delay timer set in the step 54 in FIG. 9 is equal to a value of 0. If the answer to this question is negative (NO), i.e. if the predetermined time period TMREF has not elapsed after a shift to the chip-in or chip-out, the clutch transfer torque TQCL is set to the drive-side transfer torque TQDRBLTM (step 97).

On the other hand, if the answer to the question of the step 96 is affirmative (YES), a value obtained by adding a predetermined addend term β to the clutch transfer torque TQCL is set to the drive-side transfer torque TQDRBLTM (step 98). Further, if the answer to the question of the step 95 is affirmative (YES), i.e. if it is determined that the vehicle 3 is traveling on a bad road, the program skips over the step 96 to the step 98.

In a step 99 following the step 97 or 98, the driven-side transfer torque TQDNBLTM is set to a value obtained by multiplying the drive-side transfer torque TQDRBLTM by the transmission ratio RATIO, followed by terminating the present program.

As described above, when the engine 4 is in the chip-in or chip-out, or it is determined that the vehicle 3 is traveling on a bad road, the target oil pressure PCCMDL is decreased (steps 52 and 55 in FIG. 9). Then, based on the target oil pressure PCCMDL, the clutch transfer torque TQCL is calculated (step 94), and the drive-side and driven-side transfer torques TQDRBLTM and TQDNBLTM are set according to the clutch transfer torque TQCL (steps 98 and 99). Further, the drive-side and driven-side working oil pressures DROIL and DNOIL are set according thereto, respectively (step 81 in FIG. 5). Therefore, when the engine 4 is in the chip-in or chip-our, or it is determined that the vehicle 3 is traveling on a bad road, it is possible to set the drive-side and driven-side working oil pressures DROIL and DNOIL to respective decreased values according to the decreased target oil pressure PCCMDL without excess or shortage, thereby improving fuel economy.

Further, through execution of the steps 96 to 99, after a shift to the chip-in or chip-out, the drive-side transfer torque TQDRBLTM is set to the clutch transfer torque TQCL until the lapse of the second predetermined time period TMREF is counted by the delay timer, i.e. until the start clutch 30 once allowed to slip starts to be fully engaged again, and then, after the start clutch 30 starts to be fully engaged again, the drive-side transfer torque TQDRBLTM is set to a value obtained by adding the addend term β to the clutch transfer torque TQCL, which makes it possible to positively prevent the transmission belt from slipping owing to inertia torque generated along with the re-engagement of the start clutch 30, and prevent the drive-side and driven-side working oil pressures DROIL and DNOIL from being wastefully increased. This makes it possible to further improve fuel economy.

Figure 14:
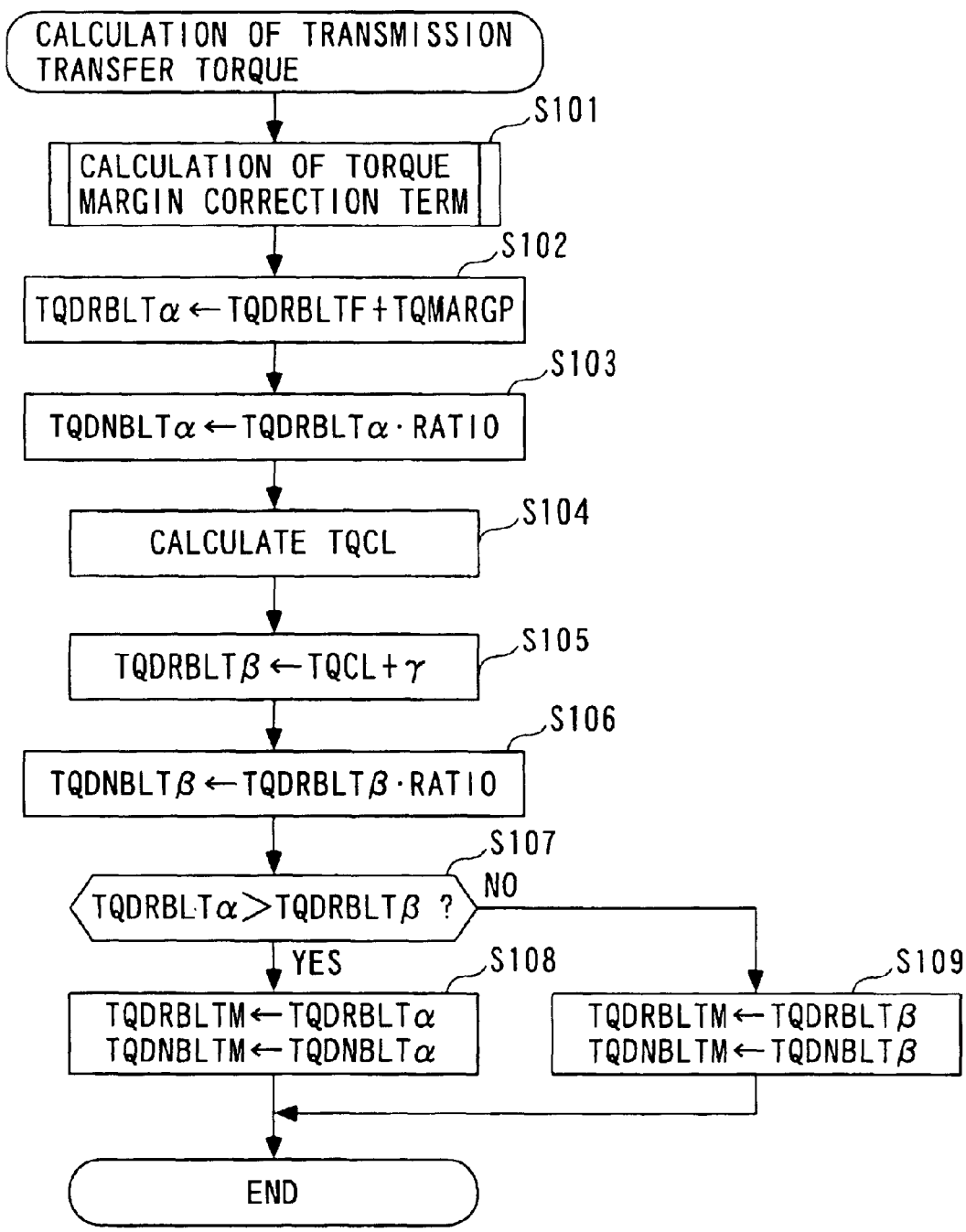
FIG. 14 is a flowchart showing a transmission transfer torque-calculating process executed by a control system according to a third embodiment of the present invention.

Next, a third embodiment of the present invention will be described with reference to FIG. 14. Similarly to the second embodiment, the third embodiment is also distinguished from the first embodiment in details of the transmission transfer torque-calculating process, and therefore, the following description will be given on the different points. First, in a step 101, the torque margin correction term-calculating process is executed similarly to that described with reference to FIG. 7. Then, in a step 102, a value obtained by adding the torque margin correction term TQMARGP to the basic value TQDRBLTF of the drive-side transfer torque calculated in the same manner as calculated in the step 2 in FIG. 6 is set to a first drive-side provisional value TQDRVLTα. Then, a value obtained by multiplying the first drive-side provisional value TQDRVLTα by the transmission ratio RATIO is set to a first driven-side provisional value TQDNVLTα (step 103).

Figure 13:
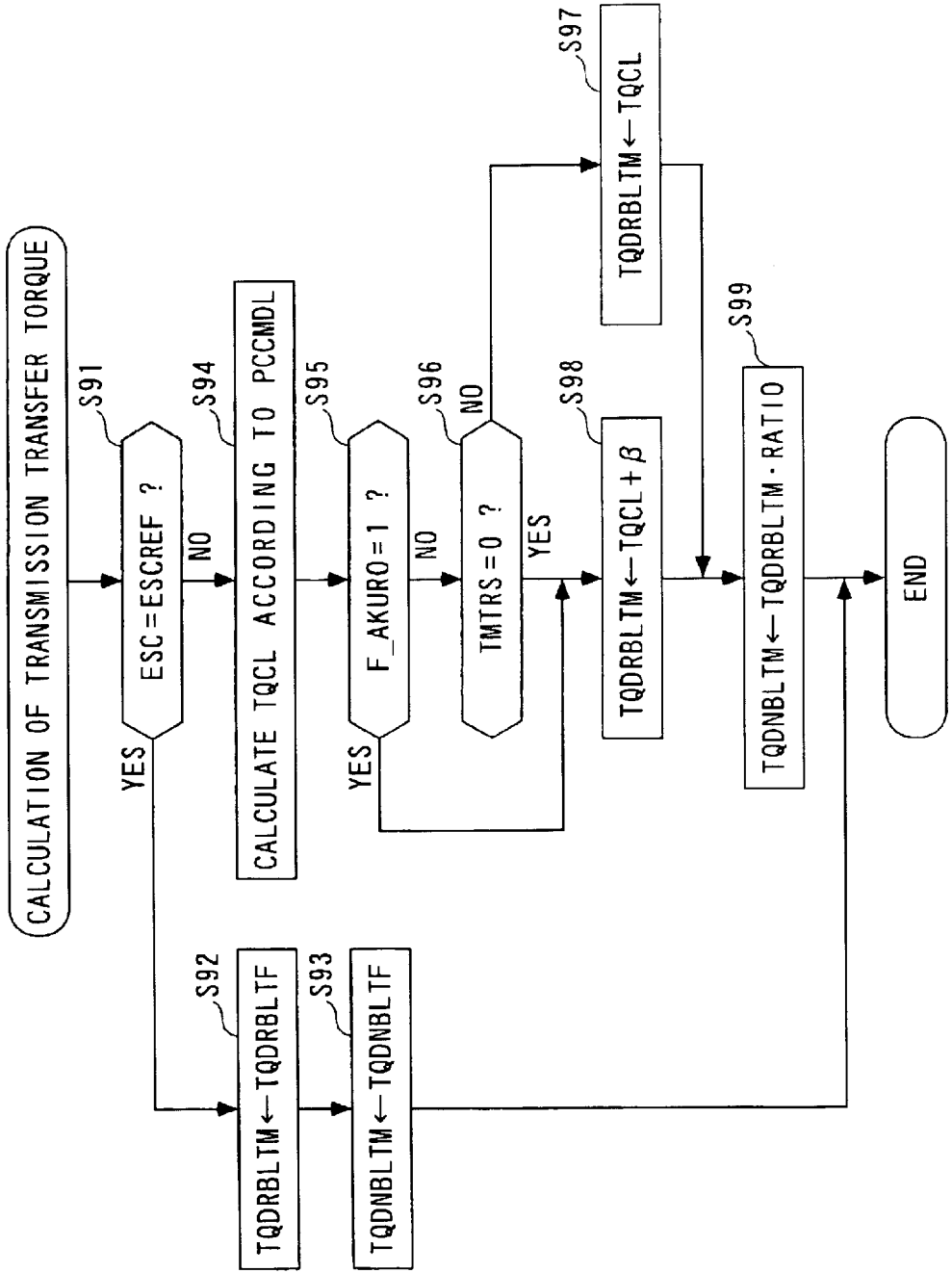
FIG. 13 is a flowchart showing a transmission transfer torque-calculating process executed by a control system according to a second embodiment of the present invention.

Then, the clutch transfer torque TQCL is calculated in the same manner as in the step 94 in FIG. 13 (step 104), and a value obtained by adding a predetermined addend term γ to the clutch transfer torque TQCL is set to a second drive-side provisional value TQDRBLTβ (step 105). Further, a value obtained by multiply the drive-side provisional value TQDRBLTβ by the transmission ratio RATIO is set to a second driven-side provisional value TQDNBLTβ (step 106).

Next, the first drive-side provisional value TQDRVLTα and the second drive-side provisional value TQDRBLTβ set in the respective steps 102 and 105 are compared with each other (step 107), and when the former TQDRVLTα is larger than the latter TQDRBLTβ, the former is set to the drive-side transfer torque TQDRBLTM, and at the same time, the first driven-side provisional value TQDNBLTβ is set to the driven-side transfer torque TQDNBLTM (step 108). On the other hand, when the second drive-side provisional value TQDRBLTβ is larger than the first drive-side provisional value TQDRVLTα, the second drive-side provisional value TQDRBLTβ is set to the drive-side transfer torque TQDRBLTM, and at the same time, the second driven-side provisional value TQDNBLTβ is set to the driven-side transfer torque TQDNBLTM (step 109), followed by terminating the present program.

As described above, according to the present embodiment, the larger one of the first drive-side provisional value TQDRBLTα calculated depending on the operating conditions of the engine 4 and the second drive-side provisional value TQDRBLTβ calculated depending on the clutch transfer torque TQCL is employed as the drive-side transfer torque TQDRBLTM, which makes it possible to positively prevent the transmission belt 24 from slipping.

The present invention is not limited to the embodiments described above, but it can be practices in various forms. For example, although in the embodiments, the vehicle 3 has the start clutch 30 disposed on the drive-wheel side with respect to the continuously variable transmission 20, by way of example, this is not limitative, but the present invention may be applied to vehicles having a start clutch disposed between the engine and the drive pulley.

It is further understood by those skilled in the art that the foregoing are preferred embodiments of the invention, and that various changes and modifications can be made without departing from the spirit and scope thereof.

What is claimed is:

1. A control system for a vehicle having a continuously variable transmission that includes a drive pulley connected to an internal combustion engine installed on the vehicle and having a variable effective diameter, a driven pulley connected to drive wheels of the vehicle and having a variable effective diameter, and a transmission belt stretched around the drive pulley and the driven pulley, and transfers power of the engine to the drive wheels while continuously variably changing a transmission ratio by changing at least one of the respective effective diameters of the drive pulley and the driven pulley, and a clutch of a friction type which is provided between the engine and the drive wheels, the control system comprising:

transmission transfer torque-setting means for setting a transmission transfer torque to be transferred from the drive pulley to the driven pulley;

clutch transfer torque-setting means for setting a clutch transfer torque to be transferred by the clutch;

control means for controlling an engaging force of the clutch based on the clutch transfer torque set by said clutch transfer torque-setting means; and bad road-determining means for determining whether or not the vehicle is traveling on a bad road, wherein said clutch transfer torque-setting means reduces the clutch transfer torque such that slippage of the clutch is allowed, when it is determined by said bad road-determining means that the vehicle is traveling on a bad road, and wherein said transmission transfer torque-setting means sets the transmission transfer torque to a larger value as the clutch transfer torque is larger, when it is determined that the vehicle is traveling on a bad road.

2. A control system as claimed in claim 1, wherein the vehicle includes an accelerator pedal, and the engine includes a throttle valve controlled according to a degree of opening of said accelerator pedal, the control system further comprising:

throttle valve opening-detecting means for detecting the degree of opening of the throttle valve, target transmission ratio-setting means for setting a target transmission ratio of the continuously variable transmission according to the detected degree of opening of the throttle valve, transmission ratio control means for controlling a transmission ratio of the continuously variable transmission such that the transmission ratio becomes equal to the set target transmission ratio, and throttle valve opening-correcting means for correcting the degree of opening of the throttle valve when it is determined that the vehicle is traveling on a bad road.

3. A control system for a vehicle having a continuously variable transmission that includes a drive pulley connected to an internal combustion engine installed on the vehicle and having a variable effective diameter, a driven pulley connected to drive wheels of the vehicle and having a variable effective diameter, and a transmission belt stretched around the drive pulley and the driven pulley, and transfers power of the engine to the drive wheels while continuously variably changing a transmission ratio by changing at least one of the respective effective diameters of the drive pulley and the driven pulley, an oil pressure pump for supplying working oil pressure to the drive pulley and the driven pulley for changing the respective effective diameters thereof, and a clutch of a friction type which is provided between the engine and the drive wheels, the control system comprising:

working oil pressure-setting means for setting the working oil pressure;

clutch transfer torque-setting means for setting a clutch transfer torque to be transferred by the clutch;

control means for controlling an engaging force of the clutch based on the clutch transfer torque set by said clutch transfer torque-setting means; and output torque change amount-detecting means for detecting an amount of change in an output torque from the engine, wherein said clutch transfer torque-setting means reduces the clutch transfer torque such that slippage of the clutch is allowed, when the amount of change in the output torque detected by said output torque change amount-detecting means is larger than a predetermined value, and wherein said working oil pressure-setting means sets the working oil pressure to a higher value as the clutch transfer torque is larger, when the amount of change in the output torque is larger than the predetermined value.

4. A control system as claimed in claim 3, further comprising clutch slippage degree-detecting means for detecting a degree of slippage of the clutch, and wherein said clutch transfer torque-setting means reduces the clutch transfer torque, and thereafter progressively increases the clutch transfer torque depending on the detected degree of slippage of the clutch.

* * * * *